United States Patent
Xu et al.

(10) Patent No.: US 12,336,000 B2
(45) Date of Patent: Jun. 17, 2025

(54) CONTINUOUS TRANSMISSION FOR NEW RADIO-UNLICENSED (NR-U) UPLINK

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/759,553

(22) PCT Filed: Mar. 26, 2020

(86) PCT No.: PCT/CN2020/081311
§ 371 (c)(1),
(2) Date: Jul. 27, 2022

(87) PCT Pub. No.: WO2021/189340
PCT Pub. Date: Sep. 30, 2021

(65) Prior Publication Data
US 2023/0090832 A1    Mar. 23, 2023

(51) Int. Cl.
*H04W 74/08*    (2024.01)
*H04L 27/26*    (2006.01)
(Continued)

(52) U.S. Cl.
CPC ..... *H04W 74/0808* (2013.01); *H04L 27/2607* (2013.01); *H04W 72/1268* (2013.01); *H04W 72/23* (2023.01)

(58) Field of Classification Search
CPC ............. H04W 74/0808; H04W 72/23; H04W 72/1268; H04L 27/2607
See application file for complete search history.

(56) References Cited

U.S. PATENT DOCUMENTS

| | | |
|---|---|---|
| 10,772,113 B2 | 9/2020 | Yerramalli et al. |
| 2010/0111224 A1 | 5/2010 | Lim et al. |

(Continued)

FOREIGN PATENT DOCUMENTS

| | | |
|---|---|---|
| EP | 3226638 A1 | 10/2017 |
| WO | 2017196684 A1 | 11/2017 |

(Continued)

OTHER PUBLICATIONS

Qualcomm Incorporated: "Enhancement to Configured Grants in NR Unlicensed", 3GPP TSG RAN WG1 Meeting #99, R1-1912941, 3rd Generation Partnership Project, Mobile Competence Centre, 650, Route Des Lucioles, F-06921 Sophia-antipolis Cedex, France, vol. RAN WG1, No. Reno, USA, Nov. 18, 2019-Nov. 22, 2019, Nov. 9, 2019, pp. 1-12, XP051823704.

(Continued)

*Primary Examiner* — Derrick V Rose
(74) *Attorney, Agent, or Firm* — Haynes and Boone, LLP

(57) ABSTRACT

Wireless communications systems and methods related to uplink (UL) transmissions with CP extensions. A user equipment (UE) receives, from a base station (BS), one or more grants for a plurality of uplink transmissions in a shared radio frequency band. The UE determines a cyclic prefix (CP) extension length for a first uplink transmission of the plurality of uplink transmissions such that a first gap duration between a second uplink transmission of the plurality of uplink transmissions and the first uplink transmission satisfies a first time threshold for transmitting the first uplink transmission in the shared radio frequency band without a listen-before-talk (LBT), the second uplink transmission preceding the first uplink transmission. The UE transmits, to the BS in the shared radio frequency band, one or more uplink transmissions of the plurality of uplink transmissions, (Continued)

where the first uplink transmission with the first CP extension is transmitted without performing the LBT.

32 Claims, 10 Drawing Sheets

(51) Int. Cl.
*H04W 72/12* (2023.01)
*H04W 72/1268* (2023.01)
*H04W 72/14* (2009.01)
*H04W 72/23* (2023.01)
*H04W 74/0808* (2024.01)

(56) References Cited

U.S. PATENT DOCUMENTS

| | | |
|---|---|---|
| 2017/0222857 A1 | 8/2017 | Nory et al. |
| 2018/0062801 A1 | 3/2018 | Zhang et al. |
| 2019/0037411 A1 | 1/2019 | Wu et al. |
| 2020/0245353 A1* | 7/2020 | Tsai .................. H04W 72/23 |
| 2021/0105815 A1* | 4/2021 | Salem ................ H04W 72/21 |
| 2023/0051403 A1* | 2/2023 | Kumagai ........... H04L 27/2666 |
| 2024/0284190 A1* | 8/2024 | Myung .............. H04L 27/2607 |

FOREIGN PATENT DOCUMENTS

| | | |
|---|---|---|
| WO | 2018039111 | 3/2018 |
| WO | 2018144976 A2 | 8/2018 |
| WO | 2019088670 A1 | 5/2019 |
| WO | 2019206318 A1 | 10/2019 |
| WO | 2019240549 A1 | 12/2019 |
| WO | 2020197710 A1 | 10/2020 |

OTHER PUBLICATIONS

Qualcomm Incorporated: "TP for Channel Access Procedures for NR Unlicensed", 3GPPTSG RAN WG1 Meeting #100e, R1-2000956, 3rd Generation Partnership Project, Mobile Competence Centre, 650, Route Des Lucioles, F-06921 Sophia-antipolis Cedex, France, vol. RAN WG1, No. e-meeting, Feb. 24, 2020-Mar. 3, 2020, Feb. 15, 2020, 5 Pages, XP052344017.
Supplementary European Search Report—EP20927848—Search Authority—The Hague—Nov. 15, 2023.
Interdigital: "Summary of RACH and UL LBT Failure", 3GPP RAN WG2 Meeting #109-e, R2-2001911, Feb. 24-Mar. 6, 2020, Mar. 11, 2020, 41 Pages.
International Search Report and Written Opinion—PCT/CN2020/081311—ISA/EPO—Nov. 23, 2020.

* cited by examiner

| $b_0b_1$ | LBT Type | CP extension |
|---|---|---|
| 0 | Cat-1 16 μs | C2*symbol length − 16 us − TA |
| 1 | Cat-2 25 μs | C3*symbol length − 25 us − TA |
| 2 | Cat-2 25 μs | C1*symbol length − 25 us |
| 3 | Cat-4 | 0 |

CONTINUOUS TRANSMISSION FOR NEW RADIO-UNLICENSED (NR-U) UPLINK

CROSS-REFERENCE TO RELATED APPLICATIONS

The present application is a 35 U.S.C. 371 National Phase entry of Patent Cooperation Treaty (PCT) Application No. PCT/CN2020/081311, filed Mar. 26, 2020. The aforementioned application is hereby expressly incorporated herein by reference in its entirety.

TECHNICAL FIELD

This application relates to wireless communication systems, and more particularly to uplink (UL) transmissions with CP extensions in a shared radio frequency band (e.g., in a shared spectrum or an unlicensed spectrum).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may perform LBT to determine whether there are active transmissions in the channel. If the LBT results in an LBT pass, the transmitting node may transmit a preamble to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE) from a base station (BS), one or more grants for a plurality of uplink transmissions in a shared radio frequency band; determining, by the UE, a cyclic prefix (CP) extension length for a first uplink transmission of the plurality of uplink transmissions such that a first gap duration between a second uplink transmission of the plurality of uplink transmissions and the first uplink transmission satisfies a first time threshold for transmitting the first uplink transmission in the shared radio frequency band without a listen-before-talk (LBT), the second uplink transmission preceding the first uplink transmission; applying, by the UE, a first CP extension having the CP extension length to the first uplink transmission; and transmitting, by the UE to the BS in the shared radio frequency band, one or more uplink transmissions of the plurality of uplink transmissions, the transmitting the one or more uplink transmissions including transmitting the first uplink transmission with the first CP extension without performing the LBT.

In an additional aspect of the disclosure, a method of wireless communication includes receiving, by a user equipment (UE) from a base station (BS), one or more uplink grants for a plurality of uplink transmissions in a shared radio frequency band, where the one or more uplink grants include a first uplink grant for at least a first uplink transmission of the plurality of uplink transmissions, and where the first uplink grant includes a first cyclic prefix (CP) extension configuration; determining, by the UE, whether to apply the first CP extension configuration to the first uplink transmission based on a time location of the first uplink transmission within the plurality of uplink transmissions; and transmitting, by the UE to the BS in the shared radio frequency band, one or more uplink transmissions of the plurality of uplink transmissions, the first uplink transmission including a first CP extension length based on the determining.

In an additional aspect of the disclosure, a user equipment (UE) includes a transceiver configured to receive, from a base station (BS), one or more grants for a plurality of uplink transmissions in a shared radio frequency band; and a processor configured to determine a cyclic prefix (CP) extension length for a first uplink transmission of the plurality of uplink transmissions such that a first gap duration between a second uplink transmission of the plurality of uplink transmissions and the first uplink transmission satisfies a first time threshold for transmitting the first uplink transmission in the shared radio frequency band without a listen-before-talk (LBT), the second uplink transmission preceding the first uplink transmission; and apply a first CP extension having the CP extension length to the first uplink transmission, where the transceiver is further configured to transmit, to the BS in the shared radio frequency band, one or more uplink transmissions of the plurality of uplink transmissions, the first uplink transmission with the first CP extension transmitted without performing the LBT.

In an additional aspect of the disclosure, a user equipment (UE) includes a transceiver configured to receive, from a base station (BS), one or more uplink grants for a plurality of uplink transmissions in a shared radio frequency band, where the one or more uplink grants include a first uplink grant for at least a first uplink transmission of the plurality of uplink transmissions, and where the first uplink grant includes a first cyclic prefix (CP) extension configuration; and a processor configured to determine whether to apply the first CP extension configuration to the first uplink transmission based on a time location of the first uplink transmission within the plurality of uplink transmissions, where the transceiver is further configured to transmit, to the BS in the shared radio frequency band, one or more uplink transmissions of the plurality of uplink transmissions, the first uplink transmission including a first CP extension length based on the determination.

In an additional aspect of the disclosure, a non-transitory computer-readable medium having program code recorded thereon, the program code includes code for causing a user equipment (UE) to receive, from a base station (BS), one or more grants for a plurality of uplink transmissions in a shared radio frequency band; and code for causing the UE to determine a cyclic prefix (CP) extension length for a first uplink transmission of the plurality of uplink transmissions such that a first gap duration between a second uplink transmission of the plurality of uplink transmissions and the first uplink transmission satisfies a first time threshold for transmitting the first uplink transmission in the shared radio frequency band without a listen-before-talk (LBT), the second uplink transmission preceding the first uplink transmission; code for causing the UE to apply a first CP extension having the CP extension length to the first uplink transmission; and code for causing the UE to transmit, to the BS in the shared radio frequency band, one or more uplink transmissions of the plurality of uplink transmissions, where the code causing the UE to transmit the one or more uplink transmissions is configured to transmit the first uplink transmission with the first CP extension without performing the LBT.

In an additional aspect of the disclosure, a non-transitory computer-readable medium having program code recorded thereon, the program code includes code for causing a user equipment (UE) to receive, from a base station (BS), one or more uplink grants for a plurality of uplink transmissions in a shared radio frequency band, where the one or more uplink grants include a first uplink grant for at least a first uplink transmission of the plurality of uplink transmissions, and where the first uplink grant includes a first cyclic prefix (CP) extension configuration; code for causing the UE to determine whether to apply the first CP extension configuration to the first uplink transmission based on a time location of the first uplink transmission within the plurality of uplink transmissions; and code for causing the UE to transmit, to the BS in the shared radio frequency band, one or more uplink transmissions of the plurality of uplink transmissions, the first uplink transmission including a first CP extension length based on the determination.

In an additional aspect of the disclosure, a user equipment (UE) includes means for receiving, from a base station (BS), one or more grants for a plurality of uplink transmissions in a shared radio frequency band; and means for determining a cyclic prefix (CP) extension length for a first uplink transmission of the plurality of uplink transmissions such that a first gap duration between a second uplink transmission of the plurality of uplink transmissions and the first uplink transmission satisfies a first time threshold for transmitting the first uplink transmission in the shared radio frequency band without a listen-before-talk (LBT), the second uplink transmission preceding the first uplink transmission; means for applying a first CP extension having the CP extension length to the first uplink transmission; and means for transmitting, to the BS in the shared radio frequency band, one or more uplink transmissions of the plurality of uplink transmissions, where the means for transmitting the one or more uplink transmissions is configured to transmit the first uplink transmission with the first CP extension without performing the LBT.

In an additional aspect of the disclosure, a user equipment (UE) includes means for receiving, from a base station (BS), one or more uplink grants for a plurality of uplink transmissions in a shared radio frequency band, where the one or more uplink grants include a first uplink grant for at least a first uplink transmission of the plurality of uplink transmissions, and where the first uplink grant includes a first cyclic prefix (CP) extension configuration; means for determining whether to apply the first CP extension configuration to the first uplink transmission based on a time location of the first uplink transmission within the plurality of uplink transmissions; and means for transmitting, to the BS in the shared radio frequency band, one or more uplink transmissions of the plurality of uplink transmissions, the first uplink transmission including a first CP extension length based on the determination.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
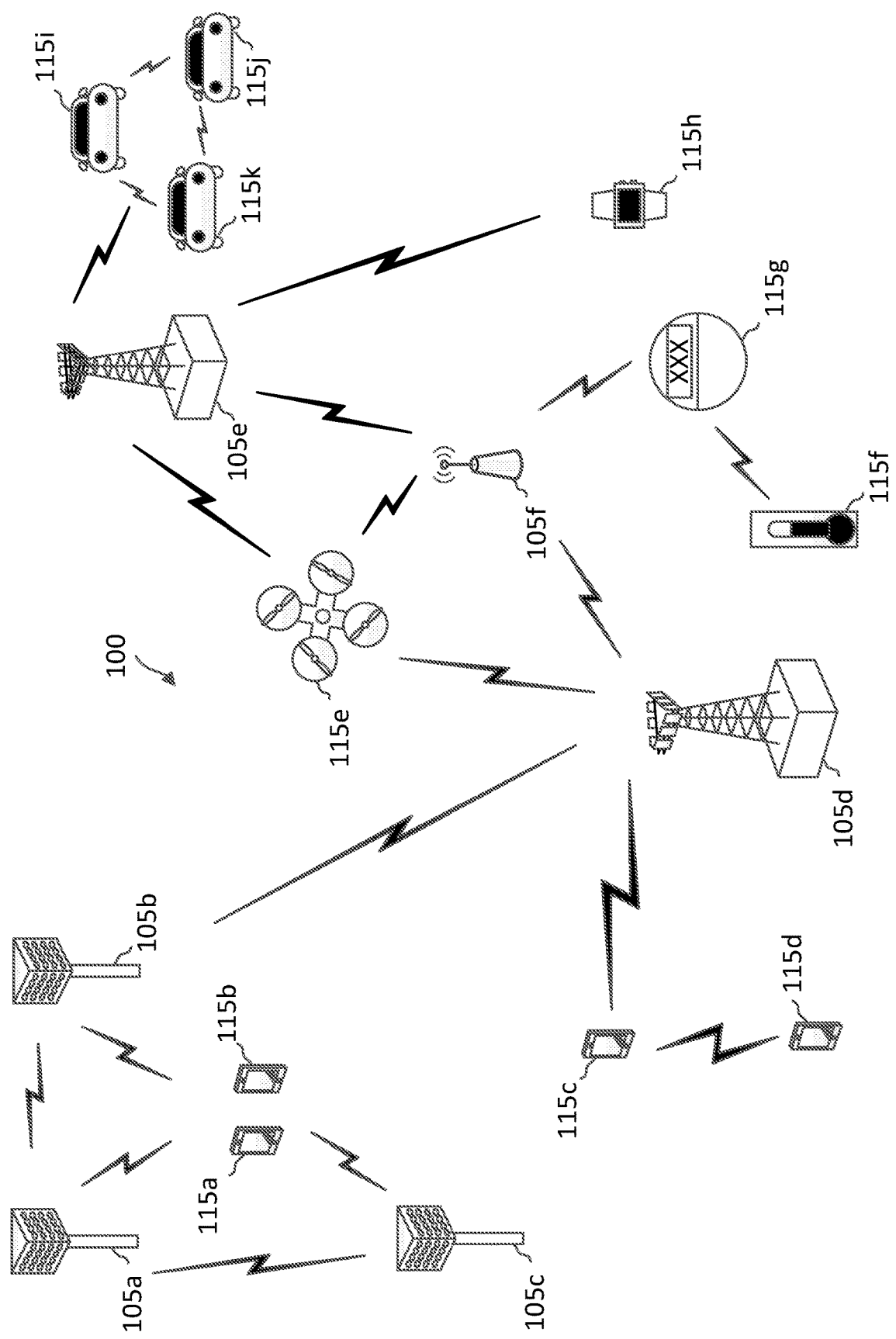
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (EUTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink (UL/DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR in an unlicensed band may be referred to as NR-U. In NR-U, a base station (BS) or a user equipment (UE) may perform channel sensing or LBT in a shared channel prior to transmitting. If the channel is available or free (e.g., with a channel signal measurement satisfying an energy detection threshold), the BS or UE may proceed with the transmission. If the channel is busy (e.g., with a channel signal measurement exceeding an energy detection threshold), the BS or UE may refrain from transmitting in the channel. In certain aspects, a wireless communication network may allow a node (e.g., a BS or a UE) to transmit in the shared channel without performing an LBT if a transmission gap between a previous transmission (e.g., transmitted by the node) and a current transmission is sufficiently short (e.g., less than about 16 microseconds (µs)). However, if the transmission gap is long (e.g., longer than about 16 µs), the node may perform an LBT to determine whether the channel is available prior to transmitting. In some instances, the node may perform a category 2 (CAT2) LBT when a transmission gap is within a certain time range (e.g., between about 16 µs to about 25 µs). A CAT2 LBT refers to an LBT without a random backoff period. If the transmission gap is longer than a certain duration (e.g., longer than about 25 µs), the node may perform a category 4 (CAT4). A CAT4 LBT refers to an LBT with a random backoff and a variable contention window (CW).

The performing of a LBT procedure in a transmission gap may consume time and resources. Additionally, while the node is performing an LBT, another mode may potentially gain access to the shared channel, and thus the node may have the risk of not being able to regain access to the shared channel. Accordingly, a node may desire to transmit multiple transmissions in a consecutive manner to minimize or avoid performing an LBT between the transmissions. In certain aspects, a BS may create a transmission gap of a specific duration to allow a transmitting node (e.g., a UE or a BS) to perform a certain type of LBT (e.g., no LBT, CAT2 LBT, or CAT4 LBT) prior to transmitting in the shared channel. The transmission gap may be a downlink-to-uplink (DL-to-UL) gap, an uplink-to-uplink (UL-to-UL) gap, or an uplink-to-downlink (UL-to-DL) gap.

One way to create a transmission gap with a tight duration is to apply a CP extension to a transmission. A tight duration may refer to a short duration with a duration as close to a predetermined duration as possible. For instance, a first communication signal may include one or more OFDM symbols and a CP extension can be prepended or attached to a beginning symbol of the one or more OFDM symbols to reduce a gap between a previous communication signal and the first communication. In certain aspects, a BS may grant a UE with a physical uplink shared channel (PUSCH) or a physical uplink control channel (PUCCH) allocation. The BS may control a transmission gap of a UL transmission by configuring the UE with a CP extension configuration. For example, the BS may transmit an uplink (UL) grant including a UL allocation (e.g., PUSCH or PUCCH) for the UE and a corresponding CP extension configuration. The CP extension configuration may indicate a duration of a CP extension to be applied to the UL transmission. In some instances, a BS may configure a UE with one or more grants for a burst of UL transmissions. For instance, the BS may transmit a single UL grant granting the UE with multiple UL transmissions and may include a CP extension configuration in the UL grant. Additionally, the BS may trigger or grant the UE with one or more UL transmissions (e.g., a PUCCH transmission and/or a sounding reference signal (SRS)) via a DL grant. It may be desirable for the UE to transmit the burst of UL transmissions in a continuous manner to minimize or avoid performing an LBT between the UL transmissions.

The present application describes mechanisms for a UE to perform UL transmissions in a shared radio frequency band (e.g., in a shared spectrum or an unlicensed spectrum) with a reduced number of LBTs to achieve a continuous transmission whenever a schedule allows. A continuous transmission may refer to a burst of transmissions with no LBT in between the transmissions. For example, a BS may configure a UE with one or one or more grants for a plurality of UL transmissions in a shared radio frequency band. The one or more grants may include one or more UL grants and/or one or more DL grants. For example, a UL grant may grant the UE a PUSCH allocation, a PUCCH allocation, and/or an SRS allocation and may include a CP extension configuration. A DL grant may grant the UE with a PUCCH allocation and/or an SRS allocation. In some aspects, the DL grant may grant the UE with a physical downlink shared channel (PDSCH) allocation, where the PUCCH allocation and/or the SRS allocation may be associated with the PDSCH allocation. The plurality of UL transmissions may be in succession, one after another with one or more short transmission gaps (e.g., of about 1 symbol duration, 2 symbol duration, or 3 symbol duration) among the transmissions. The BS may configure the UE with rules to determine when to apply a CP extension and/or how to apply a CP extension when the UE is granted with one or more grants for a burst or succession of UL transmissions and the one or more grants include one or more CP extension configurations.

In some aspects, if a transmission gap preceding a transmission is less than one symbol duration, the BS may allow the UE to apply a CP extension to narrow down the transmission gap to be within a certain duration (e.g., less than 16 µs) and transmit the transmission without performing an LBT. For instance, the UE may determine a CP extension length (e.g., a duration) for a first UL transmission of the plurality of UL transmissions such that a first gap duration between a second UL transmission of the plurality of UL transmissions and the first UL transmission satisfies a first time threshold (e.g., about 16 µs) for transmitting the first UL transmission in the shared radio frequency band without an LBT, where the second UL transmission precedes the first UL transmission. The UE may apply a first CP extension having the CP extension length to the first UL transmission. The UE may transmit the plurality of UL transmissions to the BS in the shared radio frequency band. The UE may transmit the first UL transmission without performing an LBT. In some instances, the determining the CP extension length for the first UL transmission may include determining, by the UE, the CP extension length for the first UL transmission based on a transmission end time of the second UL transmission and a transmission start time of the first UL transmission scheduled by the one or more grants being spaced apart by a second gap duration satisfying a second time threshold (e.g., one symbol duration).

In some aspects, the BS may configure the UE with a single grant for multiple UL transmissions. The BS may configure the UE to apply a CP extension configuration indicated by the grant to any transmission within the multiple transmissions when the transmission is preceded by a gap greater than one symbol duration. For instance, the one or more grants may include a first UL grant for at least a first UL transmission and a second UL transmission of the plurality of UL transmissions. The first UL grant may include a first CP extension configuration. The first UL transmission may be before the second UL transmission. The UE may apply the first CP extension configuration to each of the first UL transmission and the second UL transmission.

In some aspects, the BS may configure the UE not to apply a CP extension as indicated by a grant when a transmission granted by the grant is not an earliest transmission in the plurality of transmissions. For instance, the one or more grants include a first UL grant for a first UL transmission of the plurality of UL transmissions and a second UL grant for a second UL transmission of the plurality of UL transmissions. The first UL grant may include a first CP extension configuration. The second UL grant may include a second CP extension configuration. The first UL transmission may be an earliest transmission among the plurality of UL transmissions. Thus, the UE may determine to apply the first CP extension configuration to the first UL transmission based on the first UL transmission being an earliest transmission among the plurality of UL transmissions. The UE may determine not to apply the second CP extension configuration to the second UL transmission based on the second UL transmission being preceded by at least the first UL transmission.

Aspects of the present disclosure can provide several benefits. For example, the allowing the UE to apply a CP extension to narrow down a transmission gap can enable the UE to perform a transmission without a prior LBT. Reducing the number of LBTs can save processing time and/or resources at the UE and/or reduce the risk of having the UE failing to regain access to a channel after the LBT (e.g., another node gaining access to the channel during the gap while the UE is performing the LBT). Additionally, the inclusion or configuration of the CP extension configuration application rules can resolve the ambiguity of CP extension configuration indications in UL grants, for example, when a UL grant granting multiple UL transmissions with a single CP extension configuration, or when multiple UL grants granting a burst of UL transmissions with different CP extension configurations.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point (e.g., an IEEE 802.11 AP), and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, an IEEE 802.11 terminal station (STA), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply softcombining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may be a NR-U network operating over an unlicensed band (e.g., at about 3.5 GHz, 5 GHz, 5 GHz, or in a mmWave frequency). A BS 105 may configure a UE 115 with one or more grants for a plurality of UL transmissions. The UL transmissions may include a PUSCH signal (e.g., carrying UL data), a PUCCH signal (e.g., carrying UL control information), and/or an SRS (e.g., for the BS 105 to determine a channel response). The UL transmission may be scheduled as a burst of UL transmissions, which may be almost back-to-back (e.g., with about 1, 2, or 3 symbols apart). The one or more grants may include a UL grant and/or a DL grant. A UL grant may include a CP extension configuration. In some aspects, the network 100 may allow a UE 115 to apply a CP extension with a maximum duration of about one symbol duration. Thus, if a transmission gap preceding a UL transmission is shorter than or equal to about one symbol duration, the UE 115 may apply a CP extension to reduce the transmission gap to a duration satisfying a threshold for transmitting the UL transmission without an LBT. As such, the UE 115 may transmit the burst of UL transmissions in a continuous manner without performing an LBT between the UL transmissions. In some aspects, the network 100 may configure a UE 115 with rules to determine when to apply a CP extension configuration indicated by a UL grant and when not to apply a CP extension configuration indicated by a UL grant. Mechanisms for applying CP extensions to transmissions to achieve a continuous transmission are described in greater detail herein.

Figure 2:
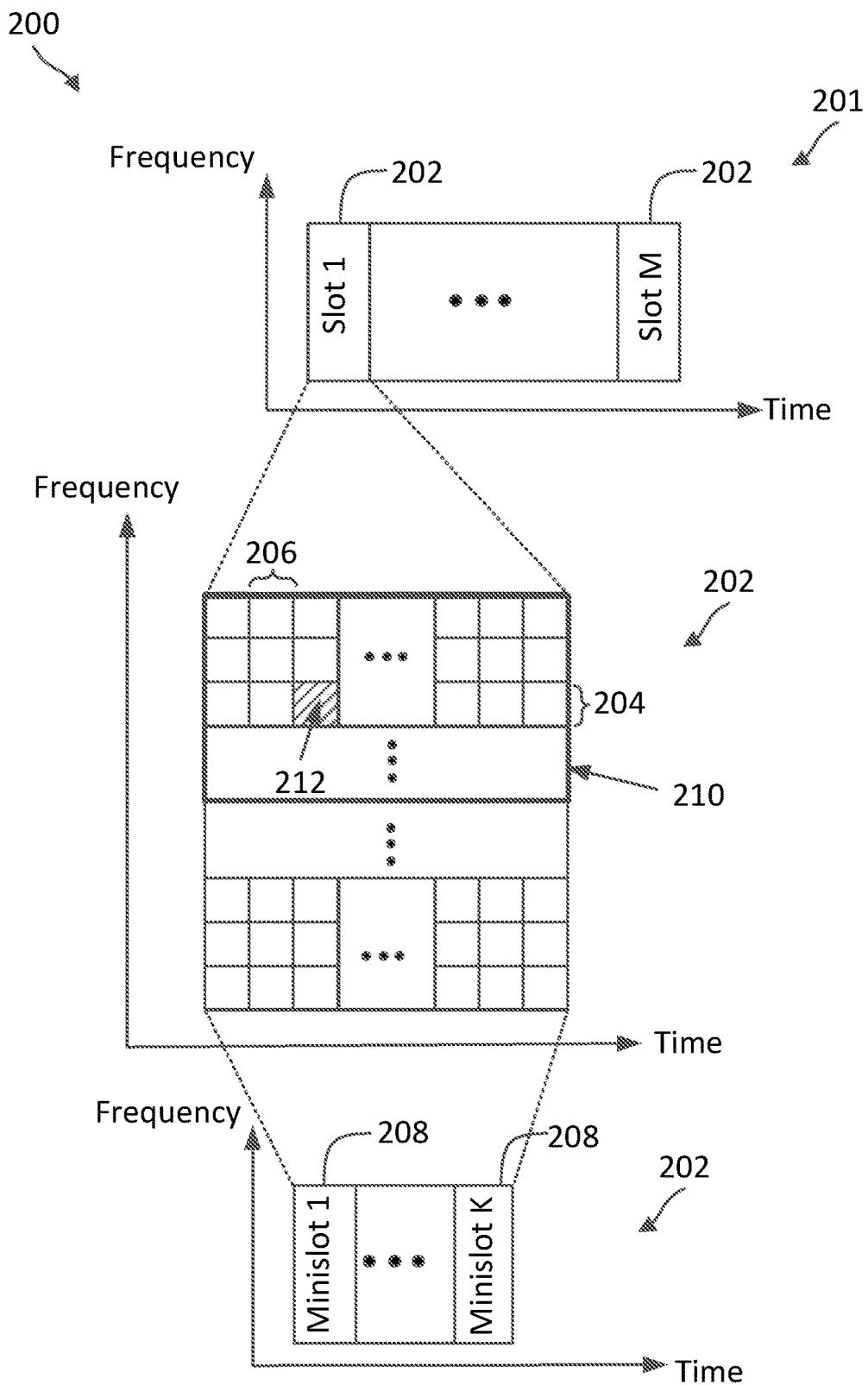
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figures 3A, 3B:
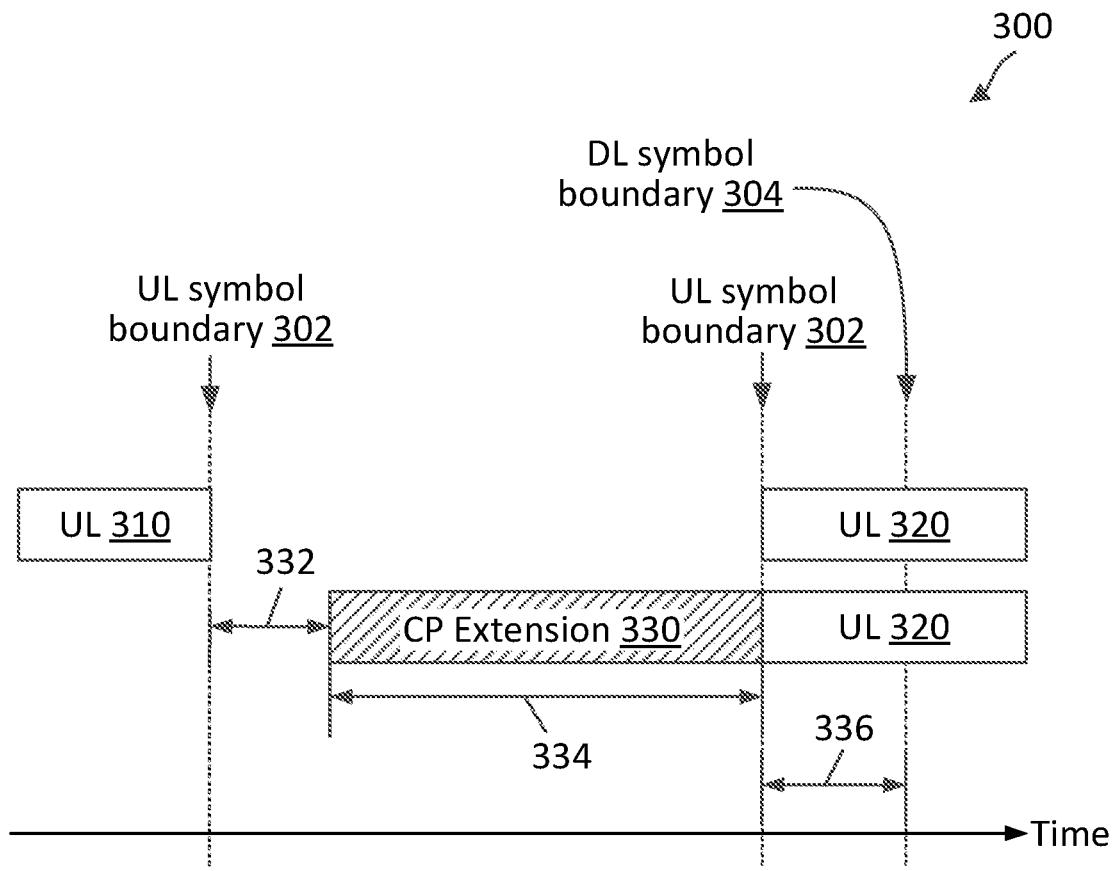
FIG. 3A is a timing diagram illustrating a transmission scheme with cyclic prefix (CP) extensions according to some embodiments of the present disclosure.
FIG. 3B illustrates a CP extension configuration scheme according to some embodiments of the present disclosure.

FIGS. 3A and 3B illustrate various mechanisms for applying a CP extension to a transmission. FIG. 3A is a timing diagram illustrating a transmission scheme 300 with CP extensions according to some embodiments of the present disclosure. The scheme 300 may be employed by BSs such as the BSs 105 and UEs such as the UEs 115 in a network such as the network 100. In particular, a BS may configure a UE to transmit a UL transmission with a CP extension as shown in the scheme 300. In FIG. 3A, the x-axis represents time in some arbitrary units. For simplicity of illustration and discussion, the scheme 300 is described in the context of a UL-to-UL transmission gap between two UL transmissions. However, the scheme 300 may be applied to a UL-to-DL transmission gap between a UL transmission and a DL transmission and/or between a DL-to-UL transmission gap between a DL transmission and a UL transmission.

In the illustrated example of FIG. 3A, a BS (e.g., the BS 105) may configure a UE (e.g., the UE 115) with a UL transmission 310 and a UL transmission 320. The UL transmissions 310 and 320 may be transmitted according to the radio frame structure 200 of FIG. 2. For instance, the BS may schedule the UL transmissions 310 and/or 320 in a slot (e.g., the slots 202) or a mini-slot (e.g., the mini-slots 208) and may assign one or more REs (e.g., the REs 212) for each of the UL transmissions 310 and 320. The UL transmission 310 may have a transmission end time at T0. The UL transmission 320 may have a transmission start time at time T1. The time T0 and T1 are aligned to a UL symbol boundary 302. In other words, the UE may perform UL transmissions 310 and 320 according to the UL symbol boundary 302. The UL symbol boundary 302 may be ahead of a DL symbol boundary 304 by an offset 336. The offset 336 is referred to as a timing advance (TA). The UE may determine the TA 336 from a random access procedure during an initial network access. The TA 336 accounts for the propagation delay (e.g., 2×the propagation delay) between the UE and the BS. It allows the UE's UL subframes to be synchronized to the DL subframes at the BS.

In some aspects, the BS may configure the UE to apply a CP extension 330 to the UL transmission 320. The BS may transmit a UL grant to the UE. The UL grant may indicate a schedule for a UL allocation for the UL transmission 320 and a CP extension configuration (e.g., the CP extension configuration 340 in FIG. 3B) for the UL transmission 320. The CP extension configuration may indicate a duration 334 for the CP extension 330. The BS may configure the duration 334 for the CP extension 330 to control a duration of a preceding transmission gap 332 (between the end of a preceding transmission 310 and the start of the CP extension 330). The transmission 310 is a preceding transmission of the transmission 320 when there is no other transmission between the transmission 310 and the transmission 320. The BS may select a duration 334 for the CP extension 330 to provide a tight transmission gap for a certain LBT to be performed. In an example, the BS may select a duration 334 for the CP extension 330 such that the transmission gap 332 may have a duration less than about 16 μs for no LBT to be performed prior to the UL transmission 320. In another example, the BS may select a duration 334 for the CP extension 330 such that the transmission gap 332 may have a duration of about 25 μs for a CAT2 LBT to be performed prior to the UL transmission 320. In yet another example, the BS may configure a no CP extension mode for a CAT4 LBT to be performed prior to the UL transmission 320. In some instances, the BS may also consider the TA 336 when determining a CP extension configuration. In some instances, the BS may allow a maximum CP extension duration of about one symbol duration (e.g., the symbol 206) for any subcarrier spacing (SCS) (e.g., at 15 kHz, 30 kHz, 60 Hz, or 120 kHz). A symbol duration may vary depending on an SCS and a number of subcarriers in a symbol, and thus a maximum CP extension duration may be dependent on the SCS and the number of subcarriers in a symbol.

Upon receiving the UL grant, the UE may apply the CP extension 330 to the UL transmission 320 according to the CP extension configuration. For example, the UE may generate a UL communication signal (e.g., a PUSCH or a PUCCH) for the UL transmission 320 according to the UL grant. The UL communication signal may include one or more OFDM symbols (e.g., the symbol 206) and may carry UL data and/or UL control according to the UL grant. The UE may generate the CP extension 330, for example, by copying an end portion of a beginning symbol the one or more OFDM symbols. The UE may prepend or attach the CP extension 330 to the beginning symbol for the transmission. In other words, the CP extension 330 is located in a symbol immediately preceding the beginning symbol of the UL allocation (e.g., the UL transmission 320). The CP extension 330 may not carry any information data. The CP extension 330 functions as a filler to provide a certain gap 332 duration and can be dropped at a receiver (e.g., the BS).

FIG. 3B is discussed in relation to FIG. 3A to illustrate the use of a CP extension to control a transmission gap for a certain LBT type or LBT mode. FIG. 3B illustrates a CP extension configuration 340 according to some embodiments of the present disclosure. The CP extension configuration 340 can be used in conjunction with the scheme 300. For instance, the BS in the scheme 300 can transmit the CP extension configuration 340 along with a UL allocation for the UL transmission 320 in the UL grant.

In the illustrated example of FIG. 3B, the CP extension configuration 340 utilizes a 2-bit field including a bit b0 and a bit b1 (shown as b0b1) to indicate one of four CP extension configuration modes (including a duration 334 for a CP extension 330 and a corresponding LBT type). As shown, when b0b1 is set to a value of 0 (e.g., binary 00), the UE may compute a duration 334 for the CP extension 330 in accordance with equation (1):

$$\text{CP extension duration } 334 = C2 \times T_{symbol} - 16 \text{ μs} - TA, \quad (1)$$

where C2 may be an integer value configured by the BS (e.g., via RRC signaling), $T_{symbol}$ represents a symbol duration or symbol length, and TA represents a timing advance (e.g., the TA 336). The UE may apply a CP extension 330 with the duration 334 according to equation (1) to the UL transmission 320 and perform a CAT1 LBT (no LBT) prior to the transmission 320.

When b0b1 is set to a value of 1 (e.g., binary 01), the UE may compute a duration 334 for the CP extension 330 in accordance with equation (2):

$$\text{CP extension duration } 334 = C3 \times T_{symbol} - 25 \text{ μs} - TA, \quad (2)$$

where C3 may be an integer value configured by the BS (e.g., via RRC signaling). The UE may apply a CP extension 330 with the duration 334 according to equation (2) to the UL transmission 320 and perform a CAT2 LBT prior to the UL transmission 320. The UE may proceed with the UL transmission 320 if the CAT2 LBT results in a pass.

When b0b1 is set to a value of 2 (e.g., binary 10), the UE may compute a duration 334 for the CP extension 330 in accordance with equation (2):

$$\text{CP extension duration } 334 = C1 \times T_{symbol} - 25 \text{ μs}, \quad (3)$$

where C1 may be an integer value configured by the BS (e.g., via RRC signaling). The UE may apply a CP extension 330 with the duration 334 according to equation (3) to the UL transmission 320 and perform a CAT2 LBT prior to the transmission 320. The UE may proceed with the UL transmission 320 if the CAT2 LBT results in a pass.

When b0b1 is set to a value of 3 (e.g., binary 11), the UE may apply a CP extension 330 with a duration or length of 0. In other words, the UE may apply no CP extension 330 to the UL transmission 320. The UE may perform a CAT4 LBT prior to the UL transmission 320 and proceed with the UL transmission 320 if CAT4 LBT results in a pass.

In some aspects, the value C1 in equation (3) may be set to a value of 1 for a 15 kHz SCS or a 30 kHz SCS and may be set to a value of 2 for a 60 kHz SCS. The BS may configure the value C2 in equation (1) and/or the value C3 in equation (2) via an RRC configuration. In some instances, the RRC configuration may be a UE-specific configuration. In other words, the BS may configure different UEs with different C2 values and/or C3 values. In some aspects, the C2 and C3 values may be in the range of 1, 2, 3, 4, . . . , 28 for a 15 kHz SCS or a 30 kHz SCS. The C2 and C3 values may be in the range of 2, 3, 4, . . . , 28 for a 60 kHz SCS.

While FIG. 3B illustrates the CP extension configuration 340 with a 2-bit field for four CP extension configuration modes, the CP extension configuration 340 can be alternatively configured to utilize different number of bits for the LBT/CP extension indication and/or different values for the LBT/CP extension indication.

In some aspects, the BS may apply the CP extension configuration 340 (with the LBT type and CP extension duration) to a fallback DL grant and/or a fallback UL grant. In some aspects, a grant may not explicitly indicate a channel access priority class (CAPC) for a granted transmission. A CAPC may be associated with various LBT parameters, such as a duration to defer for an LBT, a maximum value for a CW, a minimum value of a CW, and/or a COT duration. For a UL grant, the UE may assume that the BS acquired the COT (where the UL grant is sent) using a CAPC of 4. If the UE initiates a COT (e.g., with a CAT4 LBT) for transmitting a UL transmission granted by the UL grant, the UE may select a CAPC by itself. The mapping between priority classes and traffic classes may follow the similar mechanisms as defined for UL configured grant transmissions. For instance, a certain traffic class (e.g., defined by a quality of service (QoS) class) may be allowed to access a channel using a certain CAPC. For PUCCH transmission associated with a DL grant (e.g., granted or triggered by a DL grant), the highest priority CAPC may be applied when CAT4 LBT is used.

In some aspects, a BS (e.g., the BS 105) may schedule a UE (e.g., the UE 115) with one or more grants for one or more UL transmission bursts (e.g., the UL transmissions 310 and 320). The one or more grants can include a UL grant and/or a DL grant. The one or more UL transmission bursts may include one or more of a PUSCH, a PUCCH, and/or an SRS. In some instances, a UL grant may schedule multiple PUSCH transmissions, which may be continuous. In some instances, a UL grant may trigger one or more PUSCH and/or one or more SRS, which may not be continuous (e.g., with gaps between the UL transmissions). In some instances, a DL grant may trigger one PUCCH and one or more SRS, which may not be continuous. In some instances, the BS may include a CP extension configuration (e.g., the CP extension configuration 340) in a UL grant of the one or more grants. The UL grant may trigger one or more PUSCH or a PUCCH. In general, the BS may trigger the UE with a burst of multiple UL transmissions, which may or may not be continuous. It may be desirable for the UE to apply a CP extension whenever possible to transmit the burst of multiple transmission in a continuous manner, for example, to eliminate LBT or reduce a number of LBTs within the burst of UL transmissions.

Accordingly, the present application provides techniques for a UE (e.g., the UEs 115) to determine when to apply a CP extension and/or how to apply a CP extension when receiving one or more grants for a burst of UL transmissions, where the one or more grants may include one or more CP extension configurations.

Figure 4:
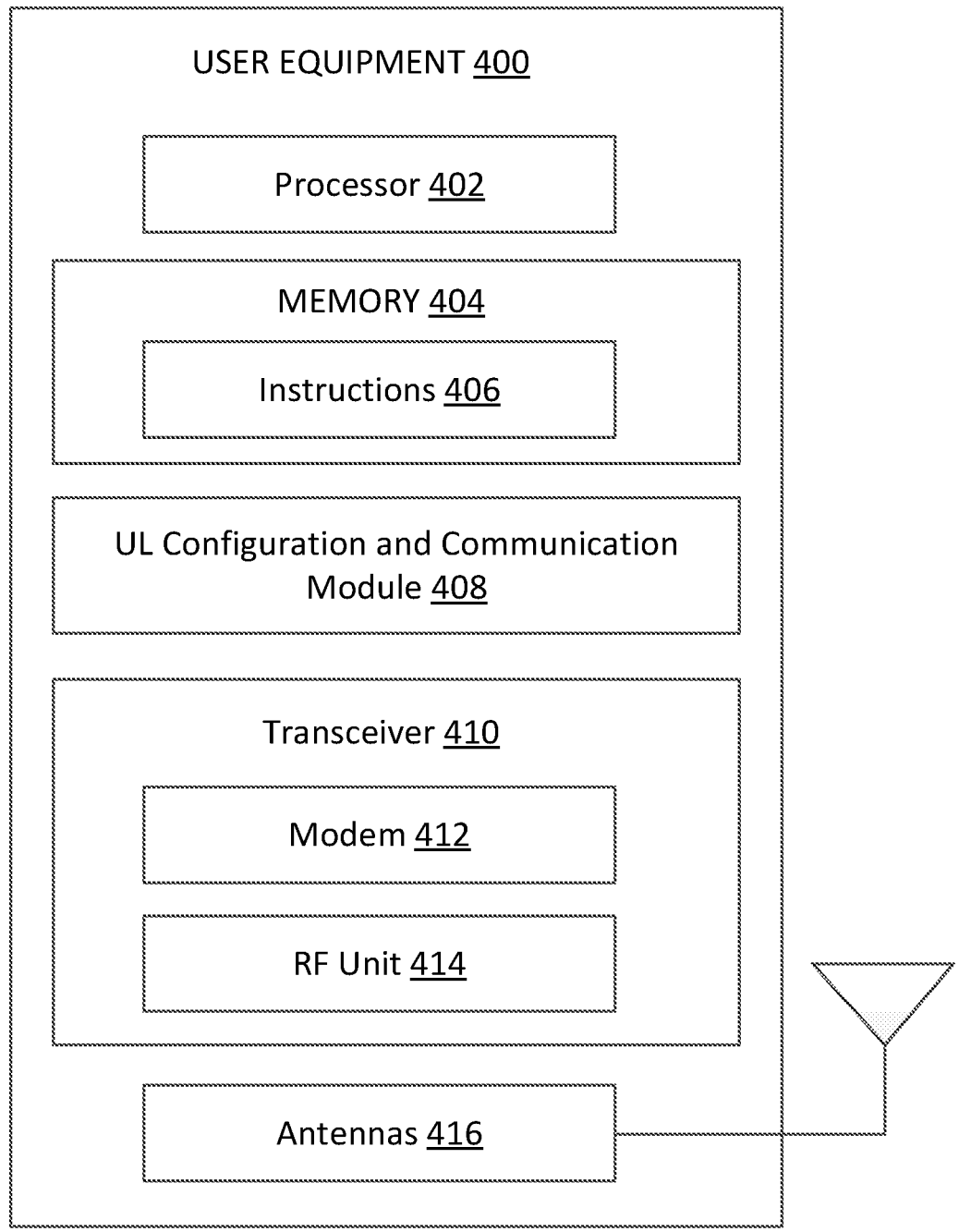
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1. As shown, the UE 400 may include a processor 402, a memory 404, a UL configuration and communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 1-3 and 5-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The UL configuration and communication module 408 may be implemented via hardware, software, or combinations thereof. For example, the UL configuration and communication module 408 may be implemented as a processor, circuit, and/or instructions 406 stored in the memory 404 and executed by the processor 402. In some instances, the UL configuration and communication module 408 can be integrated within the modem subsystem 412. For example, the UL configuration and communication module 408 can be implemented by a combination of software components (e.g., executed by a DSP or a general processor) and hardware components (e.g., logic gates and circuitry) within the modem subsystem 412.

The UL configuration and communication module 408 may be used for various aspects of the present disclosure, for example, aspects of FIGS. 1-3 and 5-10. For instance, the UL configuration and communication module 408 is configured to receive, from a BS (e.g., the BSs 105), one or one or more grants for a plurality of UL transmissions in a shared radio frequency band (e.g., in an unlicensed spectrum or a shared spectrum). The one or more grants may include one or more UL grants and/or one or more DL grants. For example, a UL grant may grant the UE 400 a PUSCH allocation, a PUCCH allocation, and/or an SRS allocation and may include a CP extension configuration. A DL grant may grant the UE 400 a PUCCH allocation and/or an SRS allocation. In some aspects, the DL grant may grant the UE 400 with a PDSCH allocation, where the PUCCH allocation and/or the SRS allocation may be associated with the PDSCH allocation. The plurality of UL transmission may be in succession, one after another with one or more short transmission gaps (e.g., of about 1 symbol duration, 2 symbol duration, or 3 symbol duration). In some aspects, the UL configuration and communication module 408 may also be configured to receive, from the BS, rules for determining when to apply a CP extension and/or how to apply a CP extension. In some aspects, the UL configuration and communication module 408 may be configured with predetermined rules for determining when to apply a CP extension and/or how to apply a CP extension.

In some aspects, a rule may indicate that a CP extension with a maximum duration of one symbol duration can be applied to narrow down or reduce a transmission gap to meet a certain time threshold for performing a transmission without an LBT. For instance, the UL configuration and communication module 408 is configured to determine a CP extension length (e.g., a duration) for a first UL transmission of the plurality of UL transmissions such that a first gap duration between a second UL transmission of the plurality of UL transmissions and the first UL transmission satisfies a first time threshold (e.g., about 16 μs) for transmitting the first UL transmission in the shared radio frequency band without an LBT, where the second UL transmission precedes the first UL transmission. The UL configuration and communication module 408 may also be configured to apply a first CP extension having the CP extension length to the first UL transmission. The UL configuration and communication module 408 may also be configured to transmit the plurality of UL transmissions to the BS in the shared radio frequency band. For instance, the UL configuration and communication module 408 may be configured to transmit the first UL transmission without performing an LBT. In some instances, the UL configuration and communication module 408 may also be configured to determine the CP extension length for the first UL transmission based on a transmission end time of the second UL transmission and a transmission start time of the first UL transmission scheduled by the one or more grants being spaced apart by a second gap duration satisfying a second time threshold (e.g., one symbol duration).

In some aspects, a rule may indicate that a CP extension configuration indicated by a grant granting multiple UL transmission may be applied to each UL transmission with a preceding gap greater than one symbol duration. For instance, the one or more grants may include a first UL grant for at least a first UL transmission and a second UL transmission of the plurality of UL transmissions. The first UL grant may include a first CP extension configuration. The first UL transmission may be before the second UL transmission. The UL configuration and communication module 408 may be configured to apply the first CP extension configuration to each of the first UL transmission and the second UL transmission.

In some aspects, a rule may indicate that a CP extension configuration indicated by a grant may not be applied to a transmission granted by the grant when the transmission is within a burst of UL transmissions and preceded by one or more of the UL transmissions. For instance, the one or more grants include a first UL grant for a first UL transmission of the plurality of UL transmissions and a second UL grant for a second UL transmission of the plurality of UL transmissions. The first UL grant may include a first CP extension configuration. The second UL grant may include a second CP extension configuration. The first UL transmission may be an earliest transmission among the plurality of UL transmissions. The UL configuration and communication module 408 may be configured to determine to apply the first CP extension configuration to the first UL transmission based on the first UL transmission being an earliest transmission among the plurality of UL transmissions. The UL configuration and communication module 408 may be configured to determine not to apply the second CP extension configuration to the second UL transmission based on the second UL transmission being preceded by at least the first UL transmission. Mechanisms for performing UL transmissions with CP extensions are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the UL configuration and communication module 408 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data (e.g., PUSCH, PUCCH, SRSs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., RRC configurations, UL grants, DL grants, CP extension configurations) to the UL configuration and communication module 408 for processing. The antennas 416 may include multiple antennas of similar or different designs in order to sustain multiple transmission links. The RF unit 414 may configure the antennas 416.

In some aspects, the transceiver 410 is configured to coordinate with the UL configuration and communication module 408 and/or the processor 402 to receive, from a BS (e.g., the BSs 105), one or more grants for a plurality of UL transmissions in a shared radio frequency band. The transceiver 410 is configured to coordinate with the UL configuration and communication module 408 and/or the processor 402 to determine a CP extension length for a first UL transmission of the plurality of UL transmissions such that a first gap duration between a second UL transmission of the plurality of UL transmissions and the first UL transmission satisfies a first time threshold for transmitting the first UL transmission in the shared radio frequency band without an LBT, the second UL transmission preceding the first UL transmission. The transceiver 410 is configured to coordinate with the UL configuration and communication module 408 and/or the processor 402 to apply a first CP extension having the CP extension length to the first UL transmission. The transceiver 410 is configured to coordinate with the UL configuration and communication module 408 and/or the processor 402 to transmit, to the BS in the shared radio frequency band, one or more UL transmissions of the plurality of UL transmissions, where the first UL transmission with the first CP extension is transmitted without performing the LBT.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
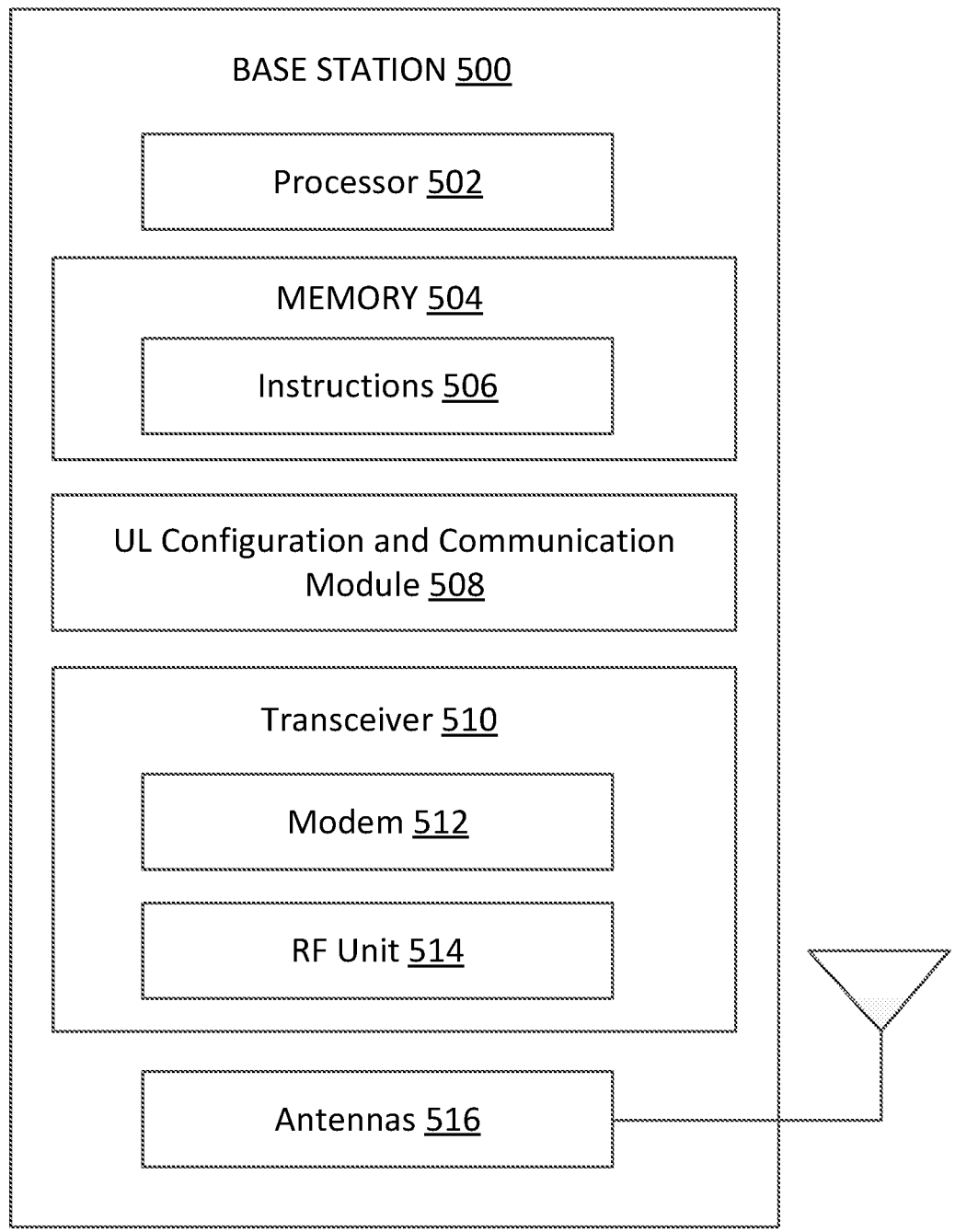
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. As shown, the BS 500 may include a processor 502, a memory 504, a UL configuration and communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-3 and 5-8. Instructions 506 may also be referred to as code, which may be interpreted broadly to include any type of computer-readable statement(s) as discussed above with respect to FIG. 4.

The UL configuration and communication module 508 may be implemented via hardware, software, or combinations thereof. For example, the UL configuration and communication module 508 may be implemented as a processor, circuit, and/or instructions 506 stored in the memory 504 and executed by the processor 502. In some instances, the UL configuration and communication module 508 can be integrated within the modem subsystem 512. For example, the UL configuration and communication module 508 can be implemented by a combination of software components (e.g., executed by a DSP or a general processor) and hardware components (e.g., logic gates and circuitry) within the modem subsystem 512.

The UL configuration and communication module 508 may be used for various aspects of the present disclosure, for example, aspects of FIGS. 1-3 and 5-8. For instance, the UL configuration and communication module 508 is configured to transmit, to a UE (e.g., the UEs 115 and/or 400), one or more grants for a plurality of UL transmissions in a shared radio frequency band (e.g., in an unlicensed spectrum or a shared spectrum). The one or more grants may include one or more UL grants and/or one or more DL grants. For example, a UL grant may grant the UE a PUSCH allocation, a PUCCH allocation, and/or an SRS allocation and may include a CP extension configuration. A DL grant may grant the UE a PUCCH allocation and/or an SRS allocation. In some aspects, the DL grant may grant the UE with a PDSCH allocation, where the PUCCH allocation and/or the SRS allocation may be associated with the PDSCH allocation. The plurality of UL transmission may be in succession, one after another with one or more short transmission gaps (e.g., of about 1 symbol duration, 2 symbol duration, or 3 symbol duration). The UL configuration and communication module 508 may also be configured to transmit, to the UE, rules for determining when to apply a CP extension and/or how to apply a CP extension. In some aspects, the rules may specify that if a transmission gap preceding a transmission is less than one symbol duration, the UE is allowed to apply a CP extension to narrow down the transmission gap to be within a certain duration (e.g., less than 16 µs) and transmit the transmission without performing an LBT prior to the transmission. Mechanisms for configuring a UE to perform UL transmissions with CP extensions are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., RRC configurations, UL grants, DL grants, CP extension configurations) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUSCH, PUCCH, and/or SRSs) to the UL configuration and communication module 508 for processing. The antennas 516 may include multiple antennas of similar or different designs in order to sustain multiple transmission links.

In some aspects, the transceiver 510 is configured to coordinate with the UL configuration and communication module 508 to transmit, to a UE, a configuration indicating a plurality of UL transmission on-off patterns that are offset from each other in time and receive, from the UE, a first UL communication signal based on a first UL transmission on-off pattern of the plurality of UL transmission on-off patterns.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
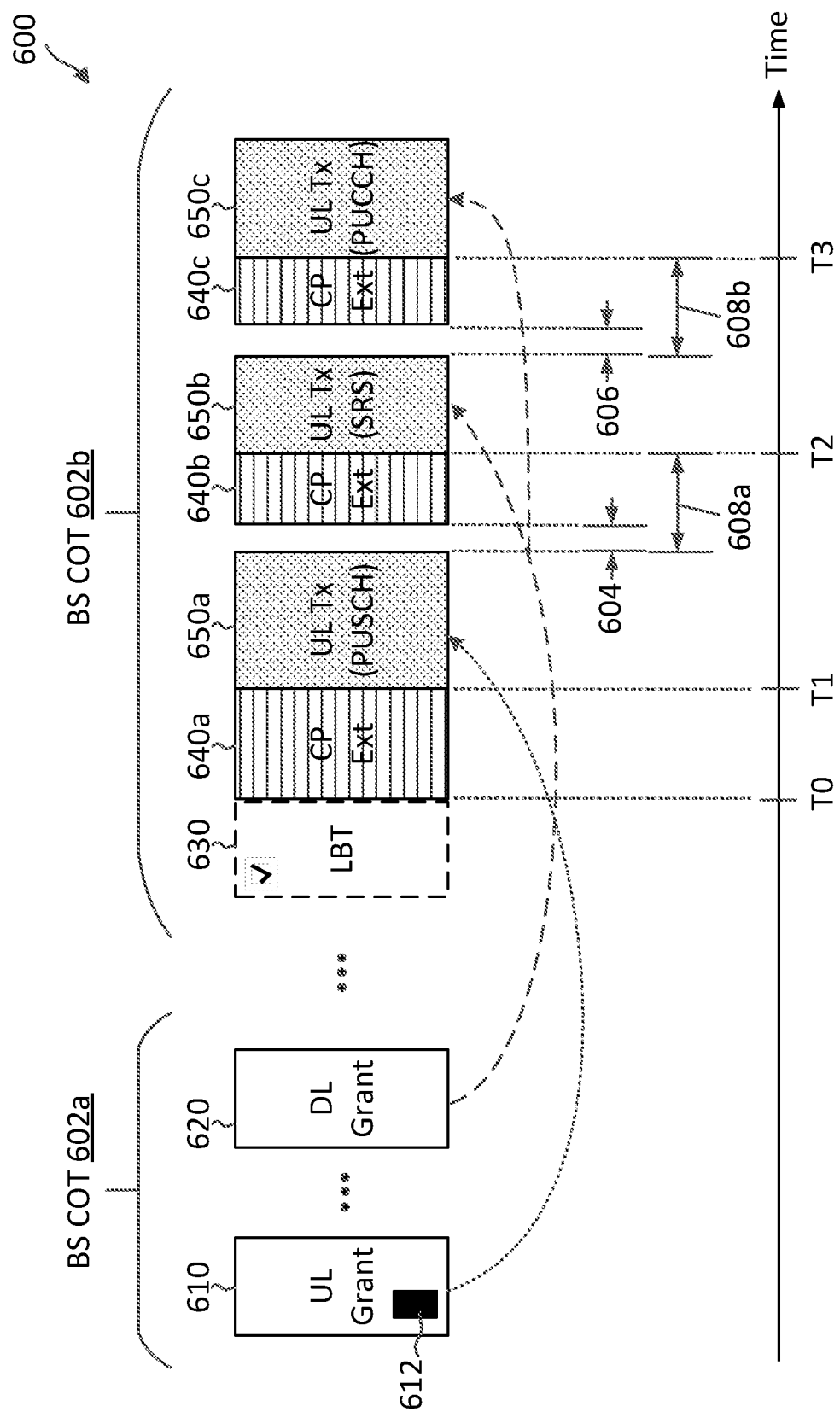
FIG. 6 illustrates an uplink (UL) transmission scheme with CP extensions according to some aspects of the present disclosure.

FIG. 6 illustrates a UL transmission scheme 600 with CP extensions according to some aspects of the present disclosure. The scheme 600 may be employed by BSs such as the BSs 105 and 400 and UEs such as the UEs 115 and 400 in a network such as the network 100. In particular, a UE may apply CP extensions to UL transmissions as shown in the scheme 600. In FIG. 6, the x-axis represents time in some arbitrary units. At a high level, the scheme 600 allows a UE (e.g., the UEs 115 and/or 400) to apply a CP extension to narrow down a transmission gap if the transmission gap is within one symbol duration so that the UE may perform a continuous transmission. A continuous transmission may refer to a burst of transmissions with no LBT in between the transmissions. In some aspects, the UE is allowed to transmit a transmission with no LBT if a gap immediately before the transmission is 16 µs or less. Accordingly, in some instances, a continuous transmission can have one or more gaps of 16 µs or less.

In the scheme 600, a BS (e.g., the BSs 105 and/or 500) may perform an LBT (e.g., a CAT4 LBT) in a shared radio frequency band (e.g., in an unlicensed spectrum or shared spectrum) to contend for a COT 602a. After passing the LBT, the BS may communicate with a UE (e.g., the UEs 115 and/or 400) during the COT 602a. For instance, the BS may transmit a UL grant 610 during the COT 602a to schedule the UE for a UL transmission 650a (e.g., a PUSCH transmission) at time T1. The BS may also transmit a DL grant 620 during the COT 602a to trigger the UE for a UL transmission 650b (e.g., an SRS) at time T2 and a UL transmission 650c (e.g., a PUCCH) at time T3 subsequent to the UL transmissions 650a. The BS may transmit the UL grant 610 and the DL grant 620 according to certain downlink control information (DCI) formats in a PDCCH. The UL grant 610 may include a CP extension configuration 612 (e.g., the CP extension configuration 340).

In the illustrated example of FIG. 6, the DL grant 620 may trigger an SRS transmission (e.g., the UL transmission 650b) one symbol (e.g., a scheduling gap 608a) after a PUSCH allocation (e.g., the UL transmission 650a). The DL grant 620 may further trigger a PUCCH transmission (e.g., the UL transmission 650c) one symbol (e.g., a scheduling gap 608b) after the SRS. In some instances, the DL grant 620 may not provide a CP extension configuration for the UL transmission 650b and/or the UL transmission 650c. In some aspects, the scheduled or triggered UL transmissions 650a, 650b, and 650c may be in a next COT 602b of the BS as shown. In some other aspects, the scheduled or triggered UL transmissions 650a, 650b, and 650c may be within the same COT 602a as where the UL grant 610 and DL grant 620 are transmitted.

Upon receiving the UL grant 610 and the DL grant 620, the UE may determine that the UL transmissions 650b and 650c scheduled by the DL grant 620 follows the UL transmission 650a scheduled by the UL grant 610. The UE may perform an LBT 630 prior to transmitting the UL transmission 650a. The LBT 630 may be of an LBT type as indicated by the CP extension configuration 612. The LBT type can be a CAT1 LBT, a CAT2 LBT or a CAT4 LBT as shown in the CP extension configuration 340 of FIG. 3. If the LBT 630 is a pass (as shown by the checkmark), the UE may apply a CP extension 640a (e.g., the CP extension 330) to the UL transmission 650a according to the CP extension configuration 612 and transmit the UL transmission 650a with the CP extension 640a. If the LBT 630 results in a failure (the channel is busy), the UE may refrain from proceeding with the UL transmission 650a.

The UE may generate the CP extension 640a with a duration according to the CP extension configuration 612. The UL transmission 650a may have one or more OFDM symbols (e.g., the symbols 206). The UE may prepend a beginning OFDM symbol of the UL transmission 650a by the CP extension 640a. The UE may begin the transmission of the UL transmission 650a with the CP extension 640a at an earlier time than the scheduled time T1 to account for the duration of the CP extension 640a. For instance, the UE may advance the transmission time by the duration of the CP extension 640a and start the transmission at time T0.

In some aspects, the UE may be aware of the UL transmissions 650a, 650b, 650c granted by the BS are in succession. Additionally, the UE may be aware that there is a one symbols gap between the UL transmission 650a and the UL transmission 650b and a one symbol gap 608b between the UL transmission 650ba and the UL transmission 650c. In some aspects, a network (e.g., the network 100) may allow a node (e.g., the BSs 105 and/or 500 and the UEs 115 and/or 400) to transmit without an LBT when a preceding gap is less than a certain threshold (e.g., about 16 μs) and the network may restrict a CP extension to have a maximum duration of about one symbol as discussed above. Accordingly, the UE may determine whether the gap 608a between a transmission end time (e.g., the time T1e) of the previous UL transmission 650a and a transmission start time (e.g., the time T2) of the UL transmission 650b satisfies a threshold of one symbol duration. If the gap 608a satisfies the one symbol duration threshold, the UE may determine to apply a CP extension 640b to the UL transmission 650b to narrow down or reduce the gap 608a such that the reduced gap 604 may have a duration satisfying the threshold for no LBT. For instance, the UE may determine a length or duration for the CP extension 640b such that the gap 608a is less than 16 μs. The UE may apply the CP extension 640b to the UL transmission 650b and transmit the UL transmission 650b without an LBT. Similarly, the UE may determine that the gap 608b satisfies the one symbol duration threshold, and thus may determine a length or duration for the CP extension 640c such that the gap 608b is reduced to a gap 606 having a duration less than the threshold (e.g., about 16 μs). The UE may apply the CP extension 640c to the UL transmission 650c and transmit the UL transmission 650c without an LBT.

In some aspects, the UE may apply the CP extension 640b with the maximum duration of one symbol duration to completely fill the gap 608a preceding the UL transmission 650b and/or apply the CP extension 640c with the maximum duration of one symbol duration to completely fill the gap 608b preceding the UL transmission 650c.

While the scheme 600 is illustrated with one UL grant 610 scheduling one UL transmission 650a and one DL grant 620 scheduling two UL transmissions 650b and 650c, the scheme 600 may be applied to any combination of grants (e.g., one or more UL grants and/or one or more DL grants) for any combination of UL transmissions (e.g., PUSCH, PUCCH, and/or SRS) when a scheduling gap in between two UL transmissions is less than a symbol duration.

Figure 7:
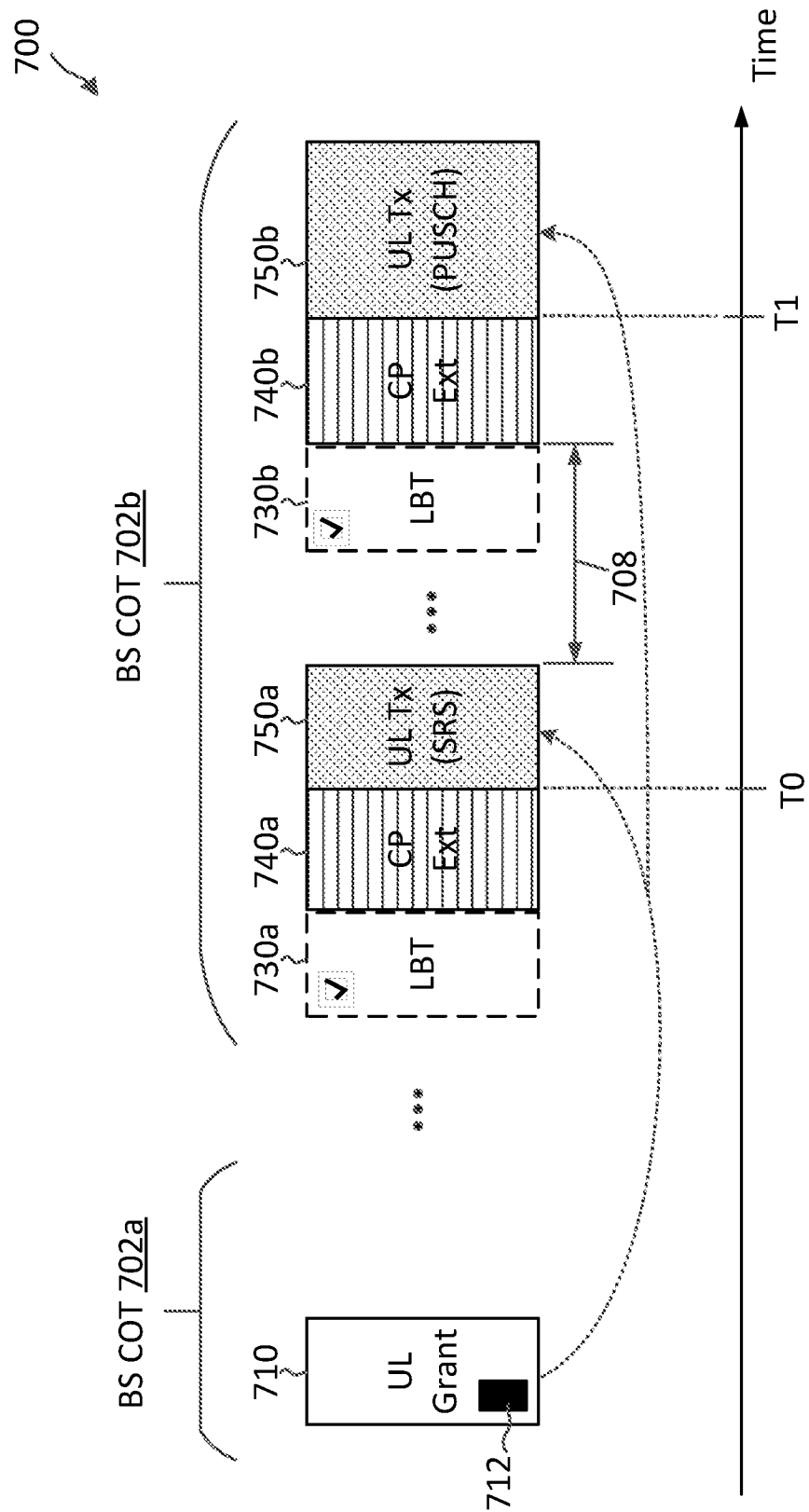
FIG. 7 illustrates a UL transmission scheme with CP extensions according to some aspects of the present disclosure.
Figure 8:
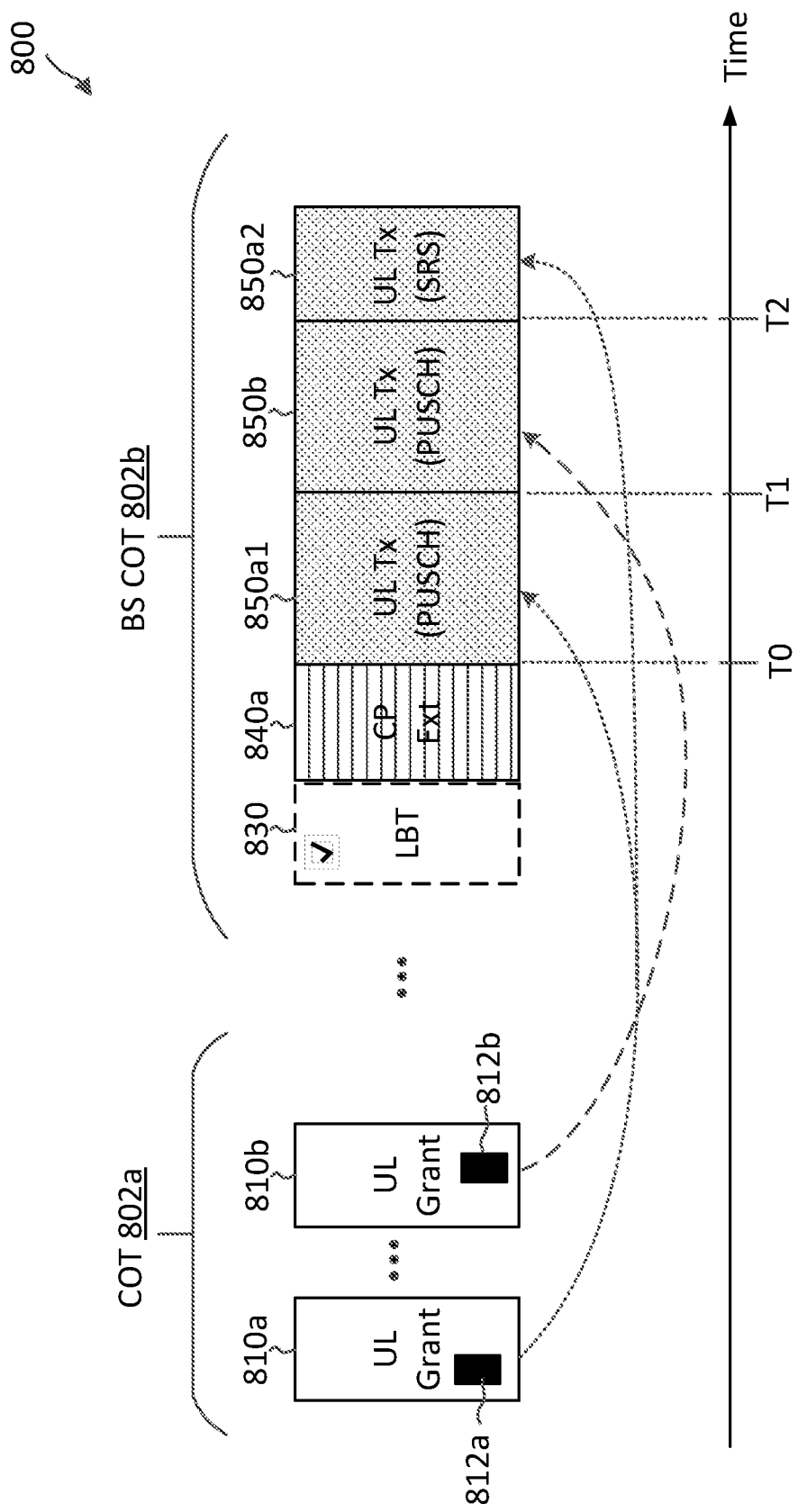
FIG. 8 illustrates a UL transmission scheme with CP extensions according to some aspects of the present disclosure.

In some aspects, a BS (e.g., the BS 105 and/or 500) may schedule a UE (e.g., the UEs 115 and/or 400) with multiple UL transmissions where a gap in between two of the UL transmissions can be more than one symbol. As discussed above, a maximum CP extension duration of one symbol is allowed. Thus, when a gap is greater than one symbol, the UE may not simply apply a CP extension to narrow down a transmission gap to avoid performing an LBT. In addition, in some instances, the BS may configure the UE with a single UL grant for multiple UL transmissions. However, the UL grant may include a single CP extension configuration for an earliest UL transmission of the multiple UL transmission. FIGS. 7-8 illustrates mechanisms and/or rules for a UE to determine whether to apply a CP extension configuration to a UL transmission within a burst of UL transmissions depending on a time location of the UL transmission within the burst of UL transmissions.

FIG. 7 illustrates a UL transmission scheme 700 with CP extensions according to some aspects of the present disclosure. The scheme 700 may be employed by BSs such as the BSs 105 and 400 and UEs such as the UEs 115 and 400 in a network such as the network 100. In particular, a UE may apply CP extensions to UL transmissions as shown in the scheme 700. In FIG. 7, the x-axis represents time in some arbitrary units. At a high level, in the scheme 700, a BS (e.g., the BSs 105 and/or 500) may configure a UE (e.g., the UEs 115 and/or 400) with a UL grant triggering multiple UL transmissions with a gap greater than one symbol duration between the UL transmissions. The UL grant may include a single CP extension configuration (e.g., a 2-bit field as shown in FIG. 3B) for an earliest transmission of the multiple transmissions. The BS may configure the UE with a rule to apply the CP extension configuration to any one of the transmissions scheduled by the grant when the transmission is preceded by a gap greater than one symbol duration.

In the scheme 700, a BS (e.g., the BSs 105 and/or 500) may perform an LBT (e.g., a CAT4 LBT) in a shared radio frequency band (e.g., in an unlicensed spectrum or shared spectrum) to contend for a COT 702a. After passing the LBT, the BS may communicate with a UE (e.g., the UEs 115 and/or 400) during the COT 702a. For instance, the BS may transmit a UL grant 710 during the COT 702a to schedule the UE for a UL transmission 750a (e.g., an SRS) at time T0 and a UL transmission 750b (e.g., a PUSCH) at time T1. The BS may schedule the UL transmission 750a and the UL transmission 750b to be spaced apart by a gap 708 greater than the one symbol duration threshold. The BS may transmit the UL grant 710 according to a certain DCI format in a PDCCH. The UL grant 710 may include a CP extension configuration 712 (e.g., the CP extension configurations 340 and 612) for a first UL transmission (e.g., a beginning UL transmission or an earliest transmission). In some aspects, the scheduled or triggered UL transmissions 750a and 750b may be in a next COT 702b of the BS as shown. In some other aspects, the scheduled or triggered UL transmissions 750a and 750b may be within the same COT 702a as where the UL grant 710 is transmitted.

Upon receiving the UL grant 710, the UE may perform an LBT 730a prior to transmitting the UL transmission 750a. The LBT 730a may be of an LBT type (e.g., a CAT2 LBT or a CAT4 LBT) as indicated by the CP extension configuration 712. If the LBT 730a is a pass (as shown by the checkmark), the UE may apply a CP extension 740a (e.g., the CP extensions 330 and 640) to the UL transmission 650a according to the CP extension configuration 712 and transmit the UL transmission 750a with the CP extension 740a preceding the UL transmission 750a. The UE may utilize similar mechanisms as discussed above in the scheme 600 with reference to FIG. 6 to generate and apply the CP extension 740*a* to the UL transmission 750*a*.

Since the gap 708 between the UL transmission 750*a* and the UL transmission 750*b* is greater than one symbol, the UL transmission 750*b* may also be considered as a beginning transmission. Accordingly, the UE may determine to apply the CP extension configuration 712 to the UL transmission 750*b*. The UE may perform an LBT 730*b* prior to transmitting the UL transmission 750. The LBT 730*b* may have the same LBT type (indicated by the CP extension configuration 712) as the LBT 730*a*. If the LBT 730*b* is a pass, the UE may proceed with the UL transmission 750*b* and apply the CP extension 740 to the UL transmission 750*b*, for example, using similar mechanisms as discussed above.

In some aspects, the CP extension configuration 712 may utilize two bits to indicate the LBT type and CP extension duration as shown in the CP extension configuration 340 of FIG. 3B. As an example, the CP extension configuration 712 may indicate an LBT type of CAT2 LBT and a CP extension duration as shown in equation (2) (e.g., with b0b1 set to a value of 1). The BS may configure the UE with a C3 value via an RRC configuration prior to the scheduling of the UL grant 710. The UE determine the TA value during a random access procedure and may maintain the TA value locally at the UE (e.g., store in a memory such as the memory 404). In some other aspects, the CP extension configuration 712 may indicate a different CP extension configuration, for example, with b0b1 set to a value 0, 2, or 3, or any other suitable LBT type and CP extension duration combination.

While the scheme 700 is illustrated with a UL grant 710 scheduling two UL transmissions 750*a* and 750*b*, the scheme 700 can be applied with a UL grant scheduling any suitable number of UL transmissions (e.g., about 3, 4, 5, 6 or more) and with adjacent transmissions spaced apart by any suitable amount of time. For example, some adjacent transmissions may be spaced apart by a gap greater than one symbol duration and some other adjacent transmissions may be spaced apart by a gap less than one symbol duration. Additionally, the scheme 700 can be applied to any combination of UL transmissions (e.g., PUSCH, PUCCH, and/or SRS).

FIG. 8 illustrates a UL transmission scheme 800 with CP extensions according to some aspects of the present disclosure. The scheme 800 may be employed by BSs such as the BSs 105 and 400 and UEs such as the UEs 115 and 400 in a network such as the network 100. In particular, a UE may apply CP extensions to UL transmissions as shown in the scheme 800. In FIG. 8, the x-axis represents time in some arbitrary units. At a high level, in the scheme 800, a BS (e.g., the BSs 105 and/or 500) may configure a UE (e.g., the UEs 115 and/or 400) with multiple UL grants triggering multiple UL transmissions and each UL grant may include a CP extension configuration (e.g., a 2-bit field as shown in FIG. 3B). The BS may configure the UE not to apply a CP extension configuration according to a UL grant when the granted transmission is not an earliest transmission within the multiple granted UL transmissions.

In the scheme 800, a BS (e.g., the BSs 105 and/or 500) may perform an LBT (e.g., a CAT4 LBT) in a shared radio frequency band (e.g., in an unlicensed spectrum or shared spectrum) to contend for a COT 802*a*. After passing the LBT, the BS may communicate with a UE (e.g., the UEs 115 and/or 400) during the COT 802*a*. For instance, the BS may transmit a UL grant 810*a* and a UL grant 810*b*. The UL grant 810*a* may schedule the UE for a UL transmission 850*a*1 (e.g., a PUSCH) at time T0 and a UL transmission 850*a*2 (e.g., an SRS) at time T2 and may include a CP extension configuration 812*a*. The UL grant 810*b* may schedule the UE for a UL transmission 850*b* (e.g., a PUSCH) at time T2 (before the UL transmission 850*a*2) and may include a CP extension configuration 812*b*. In some instances, the CP extension configurations 812*a* and 812*b* may be similar to the CP extension configuration 340 indicating any one of the four modes. The BS may transmit each of the UL grants 810*a* and 810*b* according to a certain DCI format in a PDCCH. In some aspects, the scheduled or triggered UL transmissions 850*a*1, 850*a*2, and 850*b* may be in a next COT 802*b* of the BS as shown. In some other aspects, the scheduled or triggered UL transmissions 850*a*1, 850*a*2, and 850*b* may be within the same COT 802*a* as where the UL grants 810*a* and 810*b* are transmitted.

In the illustrated example of FIG. 8, while the BS schedules the UL transmissions 850*a*1, 850*a*2, and 850*b* via multiple UL grants 810*a* and 810*b*. However, the UL transmission 850*a*1, 850*a*2, and 850*b* may be scheduled as back-to-back transmission with no gap between the UL transmission 850*a*1, 850*a*2, and 850*b*. Accordingly, upon receiving the UL grants 810*a* and 810*b*, the UE may be aware that the UL transmission 850*a*1, 850*a*2, and 850*b* scheduled by the multiple grants 810*a* and 810*b* are in succession and with no gap among the UL transmission 850*a*1, 850*a*2, and 850*b*.

The UE may perform an LBT 830 prior to transmitting the UL transmission 850*a*1 based on the UL transmission 850*a* being an earliest transmission among the UL transmission 850*a*1, 850*a*2, and 850*b*. The LBT 830 may be of an LBT type (e.g., a CAT2 LBT or a CAT4 LBT) as indicated by the CP extension configuration 812*a*. If the LBT 830 is a pass (as shown by the checkmark), the UE may apply a CP extension 840*a* (e.g., the CP extensions 330, 640, and/or 740) to the UL transmission 850*a*1 according to the CP extension configuration 812*a* and transmit the UL transmission 850*a*1 with the CP extension 840*a* preceding the UL transmission 850*a*1. The UE may determine not to apply the CP extension configuration 812*b* to the UL transmission 850*b* based on the UL transmission 850*b* not being an earliest transmission in the multiple UL transmissions 850*a*1, 850*a*2, and 850*b*. In other words, when the UE determines that a UL transmission is preceded by at least one UL transmission within a succession of UL transmissions, the UE may not apply a CP extension configuration indicated by a corresponding grant. As shown, the UE transmits the UL transmission 850*b* at time T1 without applying a CP extension as indicated by the CP extension configuration 812*b*. Similarly, the UE transmits the UL transmission 850*a*2 at time T2 without applying a CP extension as indicated by the CP extension configuration 812*a* based on the UL transmission 850*a*2 being preceded by one or more UL transmissions (e.g., the UL transmissions 850*a*1 and 850*b*).

In some aspects, the CP extension configuration 812*a* may utilize two bits to indicate the LBT type and CP extension duration as shown in the CP extension configuration 340 of FIG. 3B. As an example, the CP extension configuration 812*a* may indicate an LBT type of CAT2 LBT and a CP extension duration as shown in equation (2) (e.g., with b0b1 set to a value of 1). The BS may configure the UE with a C3 value via an RRC configuration prior to the scheduling of the UL grant 810*a*. The UE determine the TA value during a random access procedure and may maintain the TA value locally at the UE (e.g., store in a memory such as the memory 404). In some other aspects, the CP extension configuration 812*a* may indicate a different CP extension configuration, for example, with b0b1 set to a value 0, 2, or 3, or any other suitable LBT type and CP extension duration combination.

While the scheme 800 is illustrated with two UL grants 810a and 810b scheduling three UL transmission 850a1, 850a2, and 850b, the scheme 800 may be applied to any number of UL grants (e.g., about 3, 4 or more) scheduling any suitable number of UL transmissions (e.g., about 2, 4, 5, 6 or more). Additionally, the scheme 800 can be applied to any combination of UL transmissions (e.g., PUSCH, PUCCH, and/or SRS).

In general, a BS (e.g., the BSs 105 and/or 500) may schedule a UE (e.g., the UEs 115 and/or 400) with a succession of UL transmissions (e.g., PUSCH, PUCCH, and/or SRS) via one or more grants (e.g., one or more UL grants and/or one or more DL grants) with any suitable amount of time spacing or gaps between any two adjacent UL transmissions as shown in the schemes 600, 700, and/or 800. The BS may configure the UE with rules and thresholds (e.g., a no LBT gap threshold and/or a maximum CP extension duration threshold) to determine when to apply a CP extension (e.g., the CP extensions 640b and 640c) to narrow down a transmission gap (e.g., as shown in the scheme 600 of FIG. 6) to a transmission with no LBT, when to apply a CP extension configuration (e.g., as shown in the scheme 700 of FIG. 7), or when not to apply a CP extension configuration (e.g., as shown in the scheme 800 of FIG. 8).

Figure 9:
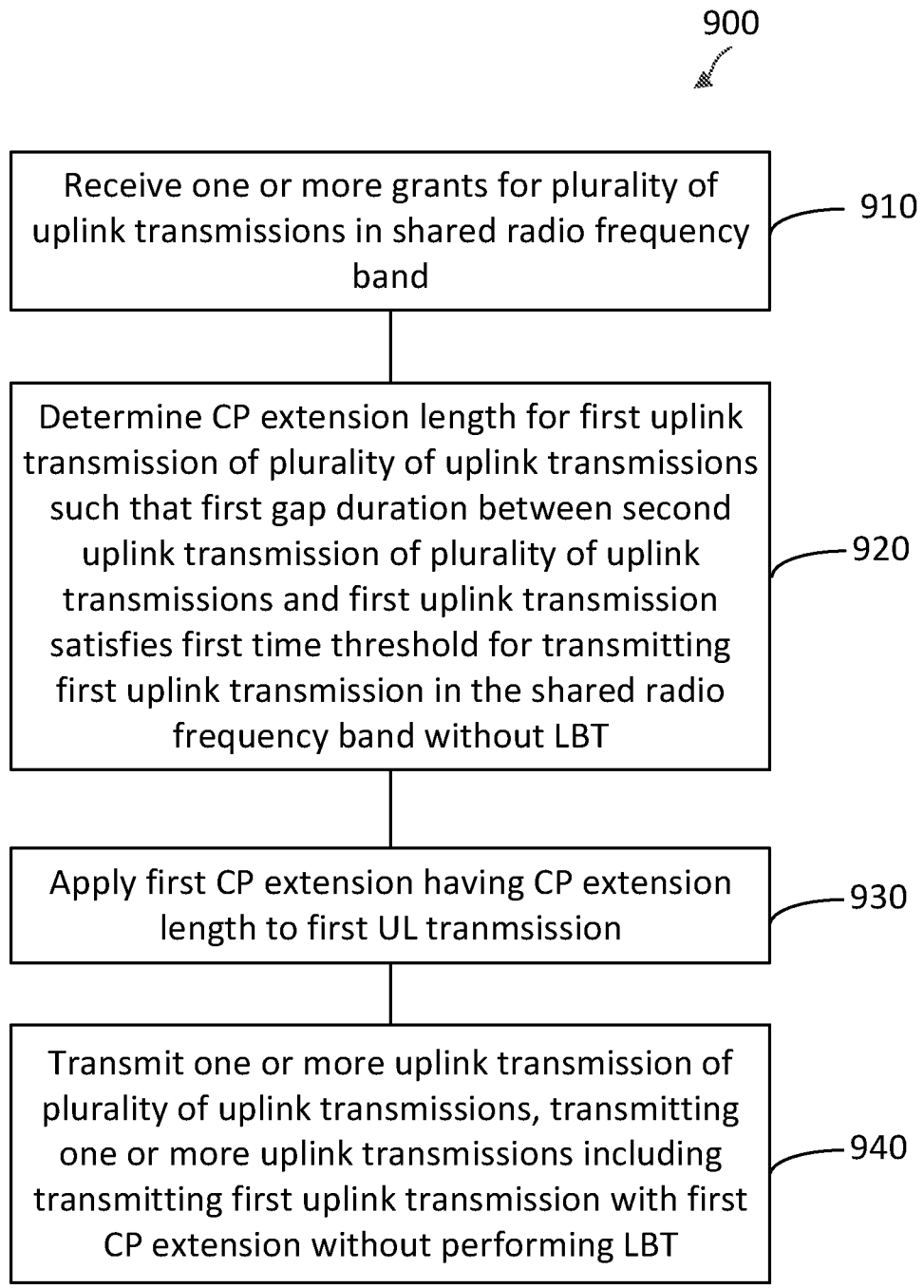
FIG. 9 is a flow diagram of a wireless communication method according to some aspects of the present disclosure.

FIG. 9 is a flow diagram of a wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115 and/or 400, may utilize one or more components, such as the processor 402, the memory 404, the UL configuration and communication module 408, the transceiver 410, the modem 412, and the one or more antennas 416, to execute the steps of method 900. The method 900 may employ similar mechanisms as discussed above in relation to FIGS. 2-3 and 6. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, a UE (e.g., the UEs 115 and/or 400) receives, from a BS (e.g., the BSs 105 and/or 500), one or more grants for a plurality of UL transmissions in a shared radio frequency band (e.g., in an unlicensed spectrum or a shared spectrum). In some instances, the UE may utilize one or more components, such as the processor 402 or 402, the UL configuration and communication module 408 or 408, the transceiver 410 or 410, the modem 412 or 412, and/or the one or more antennas 416 or 416, to receive, from the BS, the one or more grants for the plurality of UL transmissions in the shared radio frequency band.

At block 920, the UE determines a CP extension length (e.g., a duration of the CP extension 640b) for a first UL transmission (e.g., the UL transmission 650b) of the plurality of UL transmissions such that a first gap duration between a second UL transmission (e.g., the UL transmission 650a) of the plurality of UL transmissions and the first UL transmission satisfies a first time threshold for transmitting the first UL transmission in the shared radio frequency band without an LBT. The second UL transmission may precede the first UL transmission. In some instances, the UE may utilize one or more components, such as the processor 402 or 402, the UL configuration and communication module 408 or 408, the transceiver 410 or 410, the modem 412 or 412, and/or the one or more antennas 416 or 416, to determine the CP extension length for the first UL transmission.

In some aspects, the first time threshold may be 16 µs. In some aspects, the determining the CP extension length for the first UL transmission may include determining, by the UE, the CP extension length for the first UL transmission based on a transmission end time of the second UL transmission and a transmission start time of the first UL transmission scheduled by the one or more grants being spaced apart by a second gap duration satisfying a second time threshold. In some aspects, the second time threshold may be one symbol duration At block 930, the UE applies a first CP extension having the CP extension length to the first UL transmission. In some instances, the UE may utilize one or more components, such as the processor 402 or 402, the UL configuration and communication module 408 or 408, the transceiver 410 or 410, the modem 412 or 412, and/or the one or more antennas 416 or 416, to apply a first CP extension having the CP extension length to the first UL transmission.

In some aspects, the applying the first CP extension may include prepending, by the UE, a beginning symbol (e.g., the symbols 206) of the first UL transmission with the first CP extension. The CP extension may correspond to an end portion of the beginning symbol.

At block 940, the UE transmits, to the BS in the shared radio frequency band, one or more UL transmissions of the plurality of UL transmissions. The transmitting the one or more UL transmissions may include transmitting the first UL transmission with the first CP extension without performing the LBT. In some instances, the UE may utilize one or more components, such as the processor 402 or 402, the UL configuration and communication module 408 or 408, the transceiver 410 or 410, the modem 412 or 412, and/or the one or more antennas 416 or 416, to transmit, to the BS in the shared radio frequency band, one or more UL transmissions of the plurality of UL transmissions.

In some aspects, the transmitting the one or more UL transmissions may include transmitting, by the UE to the BS, the one or more UL transmissions during a COT (e.g., the COTs 602, 702, and/or 802) of the BS.

In some aspects, the receiving the one or more grants at block 910 may include receiving, by the UE from the BS, an UL grant (e.g., the UL grant 610) of the one or more grants for at least the second UL transmission. The UL grant may include a CP extension configuration (e.g., CP extension configurations 340, 612, and/or 812). The second UL transmission may be an earliest UL transmission of the one or more UL transmissions. The transmitting the one or more UL transmissions at block 940 may include transmitting, by the UE to the BS, the second UL transmission based on an LBT, the second UL transmission including a second CP extension based on the CP extension configuration.

In some aspects, the receiving the one or more grants at block 910 may include receiving, by the UE, a downlink grant of the one or more grants for at least the first UL transmission. The first UL transmission may include at least one of a PUCCH or an SRS.

Figure 10:
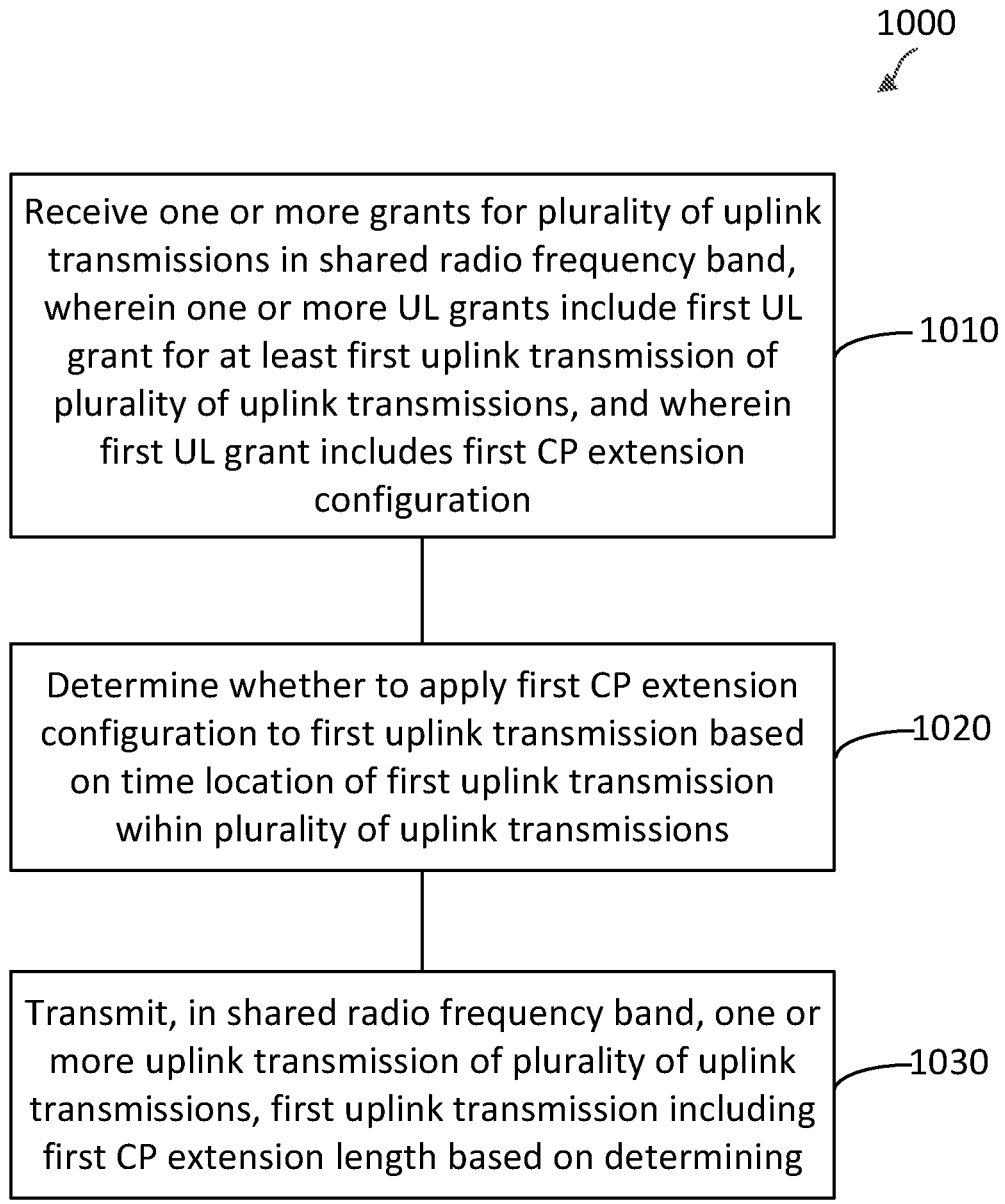
FIG. 10 is a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115 and/or 400, may utilize one or more components, such as the processor 402, the memory 404, the UL configuration and communication module 408, the transceiver 410, the modem 412, and the one or more antennas 416, to execute the steps of method 1000. The method 1000 may employ similar mechanisms as discussed above in relation to FIGS. 2-3 and 7-8. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a UE (e.g., the UEs 115 and/or 400) receives, from a BS (e.g., the BSs 105 and/or 500), one or more UL grants for a plurality of UL transmissions in a shared radio frequency band (e.g., in an unlicensed spectrum or a shared spectrum). The one or more UL grants may include a first UL grant for at least a first UL transmission of the plurality of UL transmissions. The first UL grant may include a first CP extension configuration. In some instances, the UE may utilize one or more components, such as the processor 402 or 402, the UL configuration and communication module 408 or 408, the transceiver 410 or 410, the modem 412 or 412, and/or the one or more antennas 416 or 416, to receive, from the BS, the one or more UL grants.

At block 1020, the UE determines whether to apply the first CP extension configuration to the first UL transmission based on a time location of the first UL transmission within the plurality of UL transmissions. In some instances, the UE may utilize one or more components, such as the processor 402 or 402, the UL configuration and communication module 408 or 408, the transceiver 410 or 410, the modem 412 or 412, and/or the one or more antennas 416 or 416, to determine whether to apply the first CP extension configuration to the first UL transmission.

At block 1030, the UE transmits, to the BS in the shared radio frequency band, one or more UL transmissions of the plurality of UL transmissions, the first UL transmission including a first CP extension length based on the determining. In some instances, the UE may utilize one or more components, such as the processor 402 or 402, the UL configuration and communication module 408 or 408, the transceiver 410 or 410, the modem 412 or 412, and/or the one or more antennas 416 or 416, to transmit, to the BS, the one or more UL transmissions.

In some aspects, the transmitting the one or more UL transmissions may include transmitting, by the UE to the BS, the one or more UL transmissions during a COT (e.g., the COTs 602, 702, 802) of the BS.

In some aspects, the receiving the one or more UL grants at block 1010 may include receiving, by the UE from the BS, the first UL grant for the plurality of UL transmissions. The first UL grant may include the first CP extension configuration for an earliest UL transmission of the plurality of UL transmissions. For instance, the first UL grant may correspond to the UL grant 710 and the plurality of UL transmissions may correspond to the UL transmissions 750a and 750b). In some aspects, the determining whether to apply the first CP extension configuration to the first UL transmission at block 1020 may include determining, by the UE, to apply the first CP extension configuration to the first UL transmission (e.g., the UL transmission 750b) based on the first UL transmission being after the earliest UL transmission (e.g., the UL transmission 750a) and adjacent to a gap duration (e.g., the gap 708) exceeding a time threshold, for example, as shown in the scheme 700 discussed above with reference to FIG. 7. In some aspects, the time threshold may be one symbol duration. In some aspects, the UE may further apply the first CP extension to the first UL transmission, where the first CP extension may be generated based on the first CP extension configuration. In some aspects, the UE may further perform an LBT based on the first CP extension configuration before transmitting the first UL transmission.

In some aspects, the receiving the one or more UL grants at block 1010 may include receiving, by the UE from the BS, a second UL grant for a second UL transmission of the plurality of UL transmissions, the second UL transmission preceding the first UL transmission. For instance, the second UL grant may correspond to the UL grant 810a, the first UL grant may correspond to the UL grant 810b, the second UL transmissions may correspond to the UL transmission 850a1, and the first UL transmission may correspond to the UL transmission 850b. In some aspects, the determining whether to apply the first CP extension configuration to the first UL transmission at block 1020 may include determining, by the UE, not to apply the first CP extension configuration to the first UL transmission based on the first UL transmission being preceded by at least the second UL transmission, for example, as shown in the scheme 800 discussed above with reference to FIG. 8. In some aspects, the second UL grant includes a second CP extension configuration for the second UL transmission. The UE may further determine the first CP extension length for the first UL transmission based on the second CP extension configuration for the second UL transmission. In some aspects, the UE may assign a value of 0 to the first CP extension length based on the first UL transmission being preceded by at least the second UL transmission. In some aspects, the UE may refrain from performing am LBT before the first UL transmission.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE) from a base station (BS), one or more grants for a plurality of uplink transmissions in a shared radio frequency band;
determining, by the UE, a cyclic prefix (CP) extension length for a first uplink transmission of the plurality of uplink transmissions such that a first gap duration between a second uplink transmission of the plurality of uplink transmissions and the first uplink transmission satisfies a first time threshold for transmitting the first uplink transmission in the shared radio frequency band without a listen-before-talk (LBT), the second uplink transmission preceding the first uplink transmission, wherein the determining the CP extension length for the first uplink transmission is based on a transmission end time of the second uplink transmission and a transmission start time of the first uplink transmission scheduled by the one or more grants being spaced apart by a second gap duration satisfying a second time threshold;
applying, by the UE, a first CP extension having the CP extension length to the first uplink transmission; and
transmitting, by the UE to the BS in the shared radio frequency band, one or more uplink transmissions of the plurality of uplink transmissions, the transmitting the one or more uplink transmissions including transmitting the first uplink transmission with the first CP extension without performing the LBT.

2. The method of claim 1, wherein the first time threshold is 16 microseconds (μs).

3. The method of claim 1, wherein the applying the first CP extension includes:
prepending, by the UE, a beginning symbol of the first uplink transmission with the first CP extension.

4. The method of claim 1, wherein the second time threshold is one symbol duration.

5. The method of claim 1, wherein:
the receiving the one or more grants includes:
receiving, by the UE from the BS, an uplink grant of the one or more grants for at least the second uplink transmission, the uplink grant including a CP extension configuration, and the second uplink transmission being an earliest uplink transmission of the one or more uplink transmissions; and the transmitting the one or more uplink transmissions include:
transmitting, by the UE to the BS, the second uplink transmission based on a second LBT, the second uplink transmission including a second CP extension based on the CP extension configuration.

6. The method of claim 1, wherein the receiving the one or more grants includes:
receiving, by the UE, a downlink grant of the one or more grants for at least the first uplink transmission, the first uplink transmission including at least one of a physical uplink control channel (PUCCH) signal or a sounding reference signal (SRS).

7. The method of claim 1, wherein the transmitting the one or more uplink transmissions includes:
transmitting, by the UE to the BS, the one or more uplink transmissions during a channel occupancy time (COT) of the BS.

8. A method of wireless communication, comprising:
receiving, by a user equipment (UE) from a base station (BS), one or more uplink grants for a plurality of uplink transmissions in a shared radio frequency band, wherein the one or more uplink grants include a first uplink grant for at least a first uplink transmission of the plurality of uplink transmissions, and wherein the first uplink grant includes a first cyclic prefix (CP) extension configuration;
determining, by the UE, whether to apply the first CP extension configuration to the first uplink transmission based on a time location of the first uplink transmission within the plurality of uplink transmissions, wherein the determining whether to apply the first CP extension configuration to the first uplink transmission is based on the first uplink transmission being preceded by a second uplink transmission; and
transmitting, by the UE to the BS in the shared radio frequency band, one or more uplink transmissions of the plurality of uplink transmissions, the first uplink transmission including a first CP extension length based on the determining.

9. The method of claim 8, wherein the receiving the one or more uplink grants includes:
receiving, by the UE from the BS, the first uplink grant for the plurality of uplink transmissions, the first uplink grant including the first CP extension configuration for an earliest uplink transmission of the plurality of uplink transmissions.

10. The method of claim 9, wherein the determining whether to apply the first CP extension configuration to the first uplink transmission includes:
determining, by the UE, to apply the first CP extension configuration to the first uplink transmission based on the first uplink transmission being after the earliest uplink transmission and adjacent to a gap duration exceeding a time threshold.

11. The method of claim 10, wherein the time threshold is one symbol duration.

12. The method of claim 10, further comprising:
applying, by the UE, the first CP extension to the first uplink transmission, the first CP extension based on the first CP extension configuration.

13. The method of claim 10, further comprising:
performing, by the UE, a listen-before-talk (LBT) based on the first CP extension configuration before transmitting the first uplink transmission.

14. The method of claim 8, wherein the receiving the one or more uplink grants includes:

receiving, by the UE from the BS, a second uplink grant for the second uplink transmission of the plurality of uplink transmissions, the second uplink transmission preceding the first uplink transmission.

15. The method of claim 14, wherein the second uplink grant includes a second CP extension configuration for the second uplink transmission, and wherein the method further comprises:
determining, by the UE, the first CP extension length for the first uplink transmission based on the second CP extension configuration for the second uplink transmission.

16. The method of claim 14, further comprising:
assigning, by the UE, a value of 0 to the first CP extension length based on the first uplink transmission being preceded by at least the second uplink transmission.

17. The method of claim 14, further comprising:
refraining, by the UE, from performing a listen-before-talk (LBT) before the first uplink transmission.

18. The method of claim 8, wherein the transmitting the one or more uplink transmissions includes:
transmitting, by the UE to the BS, the one or more uplink transmissions during a channel occupancy time (COT) of the BS.

19. A user equipment (UE) comprising:
a transceiver configured to receive, from a base station (BS), one or more grants for a plurality of uplink transmissions in a shared radio frequency band; and
a processor configured to:
determine a cyclic prefix (CP) extension length for a first uplink transmission of the plurality of uplink transmissions such that a first gap duration between a second uplink transmission of the plurality of uplink transmissions and the first uplink transmission satisfies a first time threshold for transmitting the first uplink transmission in the shared radio frequency band without a listen-before-talk (LBT), the second uplink transmission preceding the first uplink transmission, wherein the determining the CP extension length for the first uplink transmission is based on a transmission end time of the second uplink transmission and a transmission start time of the first uplink transmission scheduled by the one or more grants being spaced apart by a second gap duration satisfying a second time threshold; and
apply a first CP extension having the CP extension length to the first uplink transmission,
wherein the transceiver is further configured to transmit, to the BS in the shared radio frequency band, one or more uplink transmissions of the plurality of uplink transmissions, the first uplink transmission with the first CP extension transmitted without performing the LBT.

20. The UE of claim 19, wherein the first time threshold is 16 microseconds (μs).

21. The UE of claim 19, wherein the processor configured to apply the first CP extension is configured to:
prepend a beginning symbol of the first uplink transmission with the first CP extension.

22. The UE of claim 19, wherein the second time threshold is one symbol duration.

23. The UE of claim 19, wherein:
the transceiver configured to receive the one or more grants is configured to:
receive, from the BS, an uplink grant of the one or more grants for at least the second uplink transmission, the uplink grant including a CP extension configuration, and the second uplink transmission being an earliest uplink transmission of the one or more uplink transmissions; and
the transceiver configured to transmit the one or more uplink transmissions is configured to:
transmit, to the BS, the second uplink transmission based on a second LBT, the second uplink transmission including a second CP extension based on the CP extension configuration.

24. The UE of claim 19, wherein the transceiver configured to receive the one or more grants is configured to:
receive a downlink grant of the one or more grants for at least the first uplink transmission, the first uplink transmission including at least one of a physical uplink control channel (PUCCH) signal or a sounding reference signal (SRS).

25. The UE of claim 19, wherein the transceiver configured to transmit the one or more uplink transmissions is configured to:
transmit, to the BS, the one or more uplink transmissions during a channel occupancy time (COT) of the BS.

26. A user equipment (UE) comprising:
a transceiver configured to receive, from a base station (BS), one or more uplink grants for a plurality of uplink transmissions in a shared radio frequency band, wherein the one or more uplink grants include a first uplink grant for at least a first uplink transmission of the plurality of uplink transmissions, and wherein the first uplink grant includes a first cyclic prefix (CP) extension configuration; and
a processor configured to determine whether to apply the first CP extension configuration to the first uplink transmission based on a time location of the first uplink transmission within the plurality of uplink transmissions, wherein the determining whether to apply the first CP extension configuration to the first uplink transmission is based on the first uplink transmission being preceded by a second uplink transmission,
wherein the transceiver is further configured to transmit, to the BS in the shared radio frequency band, one or more uplink transmissions of the plurality of uplink transmissions, the first uplink transmission including a first CP extension length based on the determination.

27. The UE of claim 26, wherein the transceiver configured to receive the one or more uplink grants is configured to:
receive, from the BS, the first uplink grant for the plurality of uplink transmissions, the first uplink grant including the first CP extension configuration for an earliest uplink transmission of the plurality of uplink transmissions.

28. The UE of claim 27, wherein the processor configured to determine whether to apply the first CP extension configuration to the first uplink transmission is configured to:
determine to apply the first CP extension configuration to the first uplink transmission based on the first uplink transmission being after the earliest uplink transmission and adjacent to a gap duration exceeding a time threshold.

29. The UE of claim 28, wherein the time threshold is one symbol duration.

30. The UE of claim 28, wherein the processor is further configured to:
apply the first CP extension to the first uplink transmission, the first CP extension based on the first CP extension configuration.

31. The UE of claim 26, wherein the transceiver configured to receive the one or more uplink grants is configured to:
    receive, from the BS, a second uplink grant for the second uplink transmission of the plurality of uplink transmissions, the second uplink transmission preceding the first uplink transmission.

32. The UE of claim 26, wherein the transceiver configured to transmit the one or more uplink transmissions is configured to:
    transmit, to the BS, the one or more uplink transmissions during a channel occupancy time (COT) of the BS.

\* \* \* \* \*